United States Patent
Ricciardulli et al.

(10) Patent No.: US 12,458,959 B2
(45) Date of Patent: Nov. 4, 2025

(54) COMPOSITIONS AND METHODS FOR TREATING POROUS MATERIALS

(71) Applicant: Amogy Inc., Brooklyn, NY (US)

(72) Inventors: Tomas Ricciardulli, Brooklyn, NY (US); Samuel Dull, Brooklyn, NY (US); Boris Sheludko, Brooklyn, NY (US)

(73) Assignee: Amogy Inc., Brooklyn, NY (US)

( * ) Notice: Subject to any disclaimer, the term of this patent is extended or adjusted under 35 U.S.C. 154(b) by 0 days.

(21) Appl. No.: 19/054,306

(22) Filed: Feb. 14, 2025

(65) Prior Publication Data

US 2025/0186982 A1 Jun. 12, 2025

Related U.S. Application Data

(63) Continuation of application No. PCT/US2024/035649, filed on Jun. 26, 2024.

(60) Provisional application No. 63/510,333, filed on Jun. 26, 2023.

(51) Int. Cl.
| | |
|---|---|
| *B01J 37/02* | (2006.01) |
| *B01J 21/04* | (2006.01) |
| *B01J 37/08* | (2006.01) |
| *C01B 3/04* | (2006.01) |

(52) U.S. Cl.
CPC .......... *B01J 37/0203* (2013.01); *B01J 21/04* (2013.01); *B01J 37/08* (2013.01); *C01B 3/047* (2013.01)

(58) Field of Classification Search
CPC ........ B01J 37/0203; B01J 21/04; B01J 37/08; B01J 21/02; B01J 21/08; B01J 21/18; B01J 23/462; B01J 37/12; B01J 37/16; C01B 3/047

USPC ........................ 502/325, 332, 355
See application file for complete search history.

(56) References Cited

U.S. PATENT DOCUMENTS

| | | | |
|---|---|---|---|
| 4,111,831 A | 9/1978 | Maness | |
| 4,497,910 A * | 2/1985 | Quang | ............ B01J 23/462 |
| | | | 518/715 |
| 5,055,282 A | 10/1991 | Shikada et al. | |
| 7,071,239 B2 | 7/2006 | Ortego, Jr. et al. | |
| 7,282,467 B2 | 10/2007 | Huisman et al. | |
| 9,359,270 B2 | 6/2016 | Daly et al. | |

(Continued)

FOREIGN PATENT DOCUMENTS

| | | |
|---|---|---|
| CA | 3132213 A1 | 9/2020 |
| CN | 113289693 A | 8/2021 |

(Continued)

OTHER PUBLICATIONS

Cho et al., "Preparation of egg-shell-type Ni/Ru bimetal alumina pellet catalysts: Steam methane reforming for hydrogen production," International Journal of Hydrogen Energy, Jul. 2017, 42(29):18350-18357.

(Continued)

*Primary Examiner* — Patricia L. Hailey
(74) *Attorney, Agent, or Firm* — Fish & Richardson P.C.

(57) ABSTRACT

The present disclosure is directed to a processing solution composition comprising a metal salt, an acid, a solvent, and a non-metal reductant. The present disclosure is also directed to a method of impregnating a porous material by covering or coating the porous material with a processing solution comprising a metal salt, an acid, a solvent, and a non-metal reductant.

30 Claims, 11 Drawing Sheets

(56) References Cited

U.S. PATENT DOCUMENTS

| | | |
|---|---|---|
| 9,819,040 B2 | 11/2017 | Littau |
| 9,861,951 B2 | 1/2018 | Vu |
| 10,322,940 B2 | 6/2019 | Hosono et al. |
| 10,919,025 B2 | 2/2021 | Li et al. |
| 11,110,434 B2 | 9/2021 | Jiang et al. |
| 11,795,055 B1 | 10/2023 | Sheludko et al. |
| 2002/0028171 A1 | 3/2002 | Goetsch et al. |
| 2004/0176619 A1* | 9/2004 | Vanoppen ............... B01J 35/45 502/261 |
| 2008/0226540 A1 | 9/2008 | Felthouse et al. |
| 2010/0113260 A1* | 5/2010 | Hagemeyer ........... C01F 17/218 502/328 |
| 2012/0121488 A1 | 5/2012 | Comrie |
| 2013/0156687 A1 | 6/2013 | Araki et al. |
| 2014/0005041 A1 | 1/2014 | Jia et al. |
| 2016/0199814 A1 | 7/2016 | Bai et al. |
| 2019/0153921 A1 | 5/2019 | Gerlach et al. |
| 2020/0062590 A1 | 2/2020 | McCullough et al. |
| 2020/0269208 A1 | 8/2020 | Way et al. |
| 2021/0001311 A1 | 1/2021 | Wu et al. |
| 2021/0395101 A1 | 12/2021 | Giddey et al. |
| 2022/0234886 A1 | 7/2022 | Yamazaki et al. |

FOREIGN PATENT DOCUMENTS

| | | | |
|---|---|---|---|
| CN | 113694922 A | 11/2021 | |
| CN | 113694922 * | 8/2023 | ............ B01J 23/58 |
| EP | 0254335 B1 | 1/1988 | |
| EP | 1868941 B9 | 2/2017 | |
| EP | 3632543 A1 | 4/2020 | |
| EP | 4017947 A1 | 6/2022 | |
| JP | 2016-198720 A | 12/2016 | |
| JP | 2019-177381 A | 10/2019 | |
| WO | WO 2001/083108 A1 | 11/2001 | |
| WO | WO 2001/087770 A1 | 11/2001 | |
| WO | WO 2021/156626 A1 | 8/2021 | |
| WO | WO 2022/129294 A1 | 6/2022 | |
| WO | WO 2022/261488 A1 | 12/2022 | |

OTHER PUBLICATIONS

Fang et al. "Sacrificial Sucrose Strategy Achieved Enhancement of Ammonia Synthesis Activity over a Ceria-Supported Ru Catalyst," ACS Sustainable Chem. Eng., Jun. 2021, 9(27): 8962-8969.

Hansgen et al., "Using first principles to predict bimetallic catalysts for the ammonia decomposition reaction," Nature Chemistry, Jun. 2010, 2:484-489.

International Search Report and Written Opinion in International Appln. No. PCT/US2024/035649, mailed Sep. 18, 2024, 9 pages.

Kato et al., "Study on volatilization mechanism of ruthenium tetroxide from nitrosyl ruthenium nitrate by using mass spectrometer," Journal of Nuclear Materials, Oct. 2016, 479:123-129.

Komiyama, "Design and Preparation of Impregnated Catalysts," Catalysis Reviews Science and Engineering, 1985, 27(2):341-372, 33 pages.

Ma et al., "Effect of nitrogen co-doping with ruthenium on the catalytic performance of Ba/Ru—N—MC catalysts for ammonia synthesis," RSC Advances, Jul. 2019, 9:22045-22052.

Ohnet et al., "Experimental study of ruthenium volatilization from boiling nitric solution," Journal of Radioanalytical and Nuclear Chemistry, Jun. 2022, 331:2939-2953, 16 pages.

Saadatjou et al., "Ruthenium Nanocatalysts for Ammonia Synthesis: A Review," Chemical Engineering Communications, 2015, 202(4):420-448, 30 pages.

Shyr et al., "Preparation of nonuniformly active catalysts," Journal of Catalysis, Jun. 1980, 63(2):425-432.

\* cited by examiner

COMPOSITIONS AND METHODS FOR TREATING POROUS MATERIALS

CROSS-REFERENCE TO RELATED APPLICATION

This application claims the benefit of International Application Serial Number PCT/US2024/035649, filed on Jun. 26, 2024, which claims the benefit of U.S. Provisional Application 63/510,333 filed Jun. 26, 2023, the disclosures of which are incorporated herein in their entirety.

TECHNICAL FIELD

Various embodiments of this disclosure relate generally to compositions and methods for the treatment of porous materials.

BACKGROUND

A porous material is a material containing pores and can be characterized by, for example, its porosity, permeability, tensile strength, electrical conductivity, and tortuosity. Porous materials can be useful as catalyst support materials because porous materials exhibit a high surface area. Porous materials can support other materials that can alter physical and/or chemical properties of the porous material to adapt the porous material for use in a particular application. For example, an active catalyst material (e.g., an active metal) can be disposed on a surface of a porous material. The active catalyst material can be disposed on the surface of the porous material using many different methods, including impregnation. The activity or behavior of that material disposed on a surface of a porous material can depend on, for instance, the material's dispersion on the surface or the accessibility of the material on the surface of the porous material. Incipient wetness impregnation is an example of a method for impregnating a porous material with another material. For this example impregnation method, an active metal precursor can be dissolved in a solution, and then the metal-containing solution can be added to a porous material. Capillary action can draw the solution into the pores of the porous material. In a case where the porous material is a catalyst support material, improving or optimizing the loading or application of an active metal onto the porous material not only can improve overall catalyst performance but also can mitigate waste of the active metal, which can be an expensive material like a noble metal.

SUMMARY

This disclosure generally relates to impregnation of a porous material, which can involve disposing a desired substance on a surface of a porous material. Impregnation of the porous material can involve covering or coating the porous material with a processing solution that includes the desired substance or a precursor of the desired substance that is to be disposed on the surface of the porous material. Covering or coating the porous material with the processing solution can include, for example, immersing the porous material in the processing solution, spraying the porous material with the processing solution, dripping (e.g., via a pipette) the processing solution onto the porous material, pouring the processing solution onto the porous material, wet impregnation of the porous material using an excess of the processing solution, or incipient wetness impregnation of the porous material using an amount of the processing solution that is substantially equal to the pore volume of the porous material. The described processing solution can be used to impregnate a porous material with a desired substance (such as an active catalyst material) while avoiding or reducing deposition of a residue or other unwanted/undesirable deposit on the surface of the porous material in response to volatilization or decomposition of the processing solution during drying or heat treatment. Inclusion of a non-metal reductant (e.g., a saccharide) in the processing solution may mitigate and/or eliminate loss of the desired substance from the surface of the porous material during drying or heat treatment and/or may improve dispersion of the desired substance on the surface of the porous material during application of the processing solution (e.g., impregnation), thereby improving particular characteristics of the porous material for an intended use. Inclusion of the non-metal reductant in the processing solution not only may reduce costs associated with potential loss of materials (which, in the case of a catalyst material, can be an expensive metal compound) but also may improve covering or coating (e.g., impregnation) of the porous material with the desired substance (e.g., increases coverage by the desired substance of the surface area of the porous material). In cases where the porous material is a catalyst support and the desired substance is an active catalyst material, catalysts prepared by the described impregnation method with the processing solution can exhibit higher catalyst activity in comparison to catalysts prepared by other conventional methods.

Certain aspects of the subject matter described can be implemented as a processing solution composition for impregnating a porous material. The solution composition comprises a metal salt, an acid, a solvent, and a non-metal reductant. The metal salt comprises a ruthenium compound. The solvent comprises water and/or an organic alcohol. The acid and the metal salt have a common anion and/or a common ligand. A concentration of the metal salt in the solution composition is in a range of from about 0.01 wt % to about 25 wt %. A concentration of the non-metal reductant in the solution composition is in a range of from about 1 wt % to about 25 wt %. A molar ratio of the non-metal reductant to the metal salt in the solution composition is in a range of from about 1:10 to about 100:1. The non-metal reductant is configured to volatize or decompose at a temperature that is less than about 900° C., such that the surface of the porous material impregnated by the solution is substantially free of carbon-containing residue(s) and/or deposit(s) after volatilization or decomposition of the non-metal reductant (e.g., not detectable in a meaningful amount), or the surface of the porous material is substantially free of a detectable or detrimental amount of a carbon-containing material after drying and/or heat treatment, thereby leaving only the elemental metal or another form of the metal originating from the metal salt (e.g., an oxide of the metal) of the processing solution on the surface of the porous material.

This, and other aspects, can include one or more of the following features. In some embodiments, the metal salt comprises a chloride, a chlorite, a chlorate, a perchlorate, a nitrate, a nitrite, a nitrosyl nitrate, a sulfate, a sulfite, a phosphate, a phosphite, a carbonyl, or the salt of an organic acid. In some embodiments, the metal salt comprises an element selected from the group consisting of chlorine, nitrogen, sulfur, phosphorous, oxygen, and carbon. In some embodiments, the metal salt comprises at least one metal selected from the group consisting of nickel, rhodium, rhenium, ruthenium, iridium, cobalt, molybdenum, iron, platinum, chromium, palladium, manganese, tungsten, vanadium, zinc, and copper. In some embodiments, the metal salt comprises ruthenium nitrosyl nitrate. In some embodiments, the acid comprises hydrochloric acid, perchloric acid, nitric acid, sulfuric acid, phosphoric acid, acetic acid, or acetoacetic acid. In some embodiments, the non-metal reductant comprises a saccharide. In some embodiments, the non-metal reductant comprises a monosaccharide, a disaccharide, or both. In some embodiments, the non-metal reductant comprises sucrose. In some embodiments, the non-metal reductant comprises citric acid. In some embodiments, the processing solution comprises a binder.

Certain aspects of the subject matter described can be implemented as a method of impregnating a porous material. The method comprises forming a doped porous material. Forming the doped porous material comprises covering or coating (e.g., impregnating) the porous material with a processing solution that includes a metal salt, an acid, a solvent, and a non-metal reductant. The metal salt comprises a ruthenium compound. The solvent comprises water and/or an organic alcohol. The acid and the metal salt have a common anion and/or a common ligand. A concentration of the metal salt ranges from about 0.01 wt % to about 25 wt % with respect to a total weight of the processing solution. A concentration of the non-metal reductant ranges from about 1 wt % to about 25 wt % with respect to the total weight of the processing solution. A molar ratio of the non-metal reductant to the metal salt in the processing solution ranges from about 1:10 to about 100:1. The method comprises, after covering the porous material with the processing solution to form the doped porous material, heating the doped porous material to remove the non-metal reductant by volatilization or decomposition, wherein the surface of the porous material is substantially free of carbon-containing residue(s) and/or deposit(s) after volatilization and/or decomposition of the non-metal reductant (e.g., not detectable in a meaningful amount), or the surface of the porous material is substantially free of a detectable or detrimental amount of a carbon-containing material after heating, thereby leaving only the elemental metal or another form of the metal originating from the metal salt (e.g., an oxide of the metal) of the processing solution on the surface of the porous material. The porous material is heated to a temperature that is less than about 900° C.

This, and other aspects, can include one or more of the following features. In some embodiments, heating the doped porous material comprises maintaining the doped porous material at a temperature within a range of from about 300° C. to about 600° C. in a reducing atmosphere comprising hydrogen ($H_2$). In some embodiments, heating the doped porous material comprises maintaining the doped porous material at a temperature within a range of from about 300° C. to about 600° C. in a non-reducing atmosphere comprising oxygen ($O_2$). In some embodiments, heating the doped support comprises maintaining the doped porous material at a temperature within a range from about 300° C. to about 600° C. in a non-reducing, anoxic atmosphere. In some embodiments, the metal salt comprises a chloride, a chlorite, a chlorate, a perchlorate, a nitrate, a nitrite, a nitrosyl nitrate, a sulfate, a sulfite, a perchlorate, a phosphate, a phosphite, a carbonyl, or the salt of an organic acid. In some embodiments, the metal salt comprises an element selected from the group consisting of chlorine, nitrogen, sulfur, phosphorous, oxygen, and carbon. In some embodiments, the metal salt comprises at least one metal selected from the group consisting of nickel, rhodium, rhenium, ruthenium, iridium, cobalt, molybdenum, iron, platinum, chromium, palladium, manganese, tungsten, vanadium, zinc, and copper. In some embodiments, the acid comprises hydrochloric acid, perchloric acid, nitric acid, sulfuric acid, phosphoric acid, acetic acid, or acetoacetic acid. In some embodiments, the non-metal reductant comprises a saccharide. In some embodiments, the non-metal reductant comprises a monosaccharide, a disaccharide, or both. In some embodiments, the solution comprises a binder. In some embodiments, the porous material comprises at least one of aluminum, boron, carbon, cerium, chromium, iron, magnesium, nickel, nitrogen, silicon, titanium, zirconium, or a ceramic material. In some embodiments, the porous material comprises a form factor comprising beads, pellets, tablets, a monolith, or a structured support. In some embodiments, the porous material or the doped porous material comprises alumina.

Certain aspects of the subject matter described can be implemented as a catalyst that is prepared by any of the described methods of impregnating a porous material. In some embodiments, the catalyst comprises at least one of a rare earth metal, an alkali metal, or an alkaline earth metal.

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting. Other features and advantages of the present application will be apparent from the following detailed description and figures.

DETAILED DESCRIPTION

Figure 1:
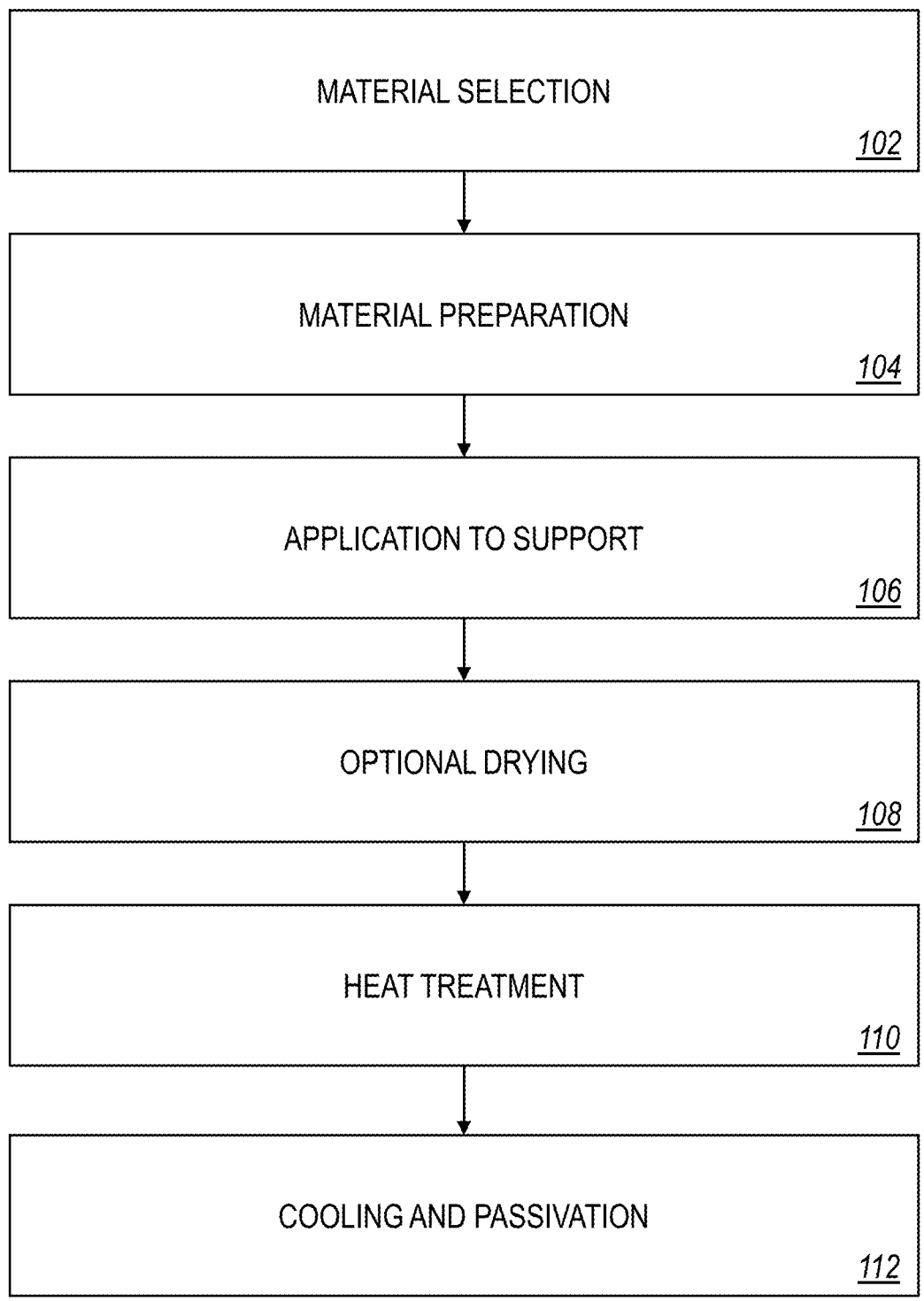
FIG. 1 is a flowchart illustrating a process for preparing processing solutions and using the processing solutions in accordance with various embodiments of the present disclosure.

FIG. 1 is a flow chart illustrating an example process 100 for impregnating a porous material with a desired substance. Process 100 include blocks 102, 104, 106, 110, and 112 (and optionally includes block 108). The following description of process 100 includes considerations for the selection of materials and treatment conditions for improving the effectiveness of porous materials for their intended function.

Material Selection

At block 102, the material is selected. The selection of materials depends on the function of the finished product and the process steps and conditions required. In some instances, the finished product may function as a molecular sieve, an adsorbent, a filter, a membrane, or a catalyst.

In some cases, the product may be in the form of smaller form factors, such as powder, beads, or pellets, which may be a porous material with the desired characteristics (e.g., chemical composition, crystal structure, pore size, specific surface area). Form factors are further discussed in more detail later in at least the section titled "Porous Material Form Factor". In some instances, the product may be based on a larger structure or form factor that requires a porous material to be applied to a surface of the larger structure or form factor. In some instances, this may require the formation of a washcoat solution containing a compatible binder. Such larger structures or form factors are further discussed in more detail later in at least the section titled "Porous Material Monoliths and Substrates".

To improve the characteristics of a porous material, various elements and/or compounds may be added to all or parts of its surface (e.g., all or part of its pores or pore walls). These elements and/or compounds may be used to change the composition and/or crystal structure of a surface layer of the porous material, or to introduce a specific material that may increase or otherwise affect the overall activity and/or selectivity of the finished product to perform a desired function.

The choice of a porous material and additional elements and/or compounds may determine the most effective method of application or desired function. In many cases, wet impregnation or incipient wetness impregnation may be a convenient and cost-effective method for laboratory synthesis and/or industrial scale production for a porous material treated with a processing solution described herein. Impregnation of a porous material is further discussed in more detail later in at least the section titled "Application of Dopants". In some instances, the metals to be applied to a surface of a porous material may be available as compounds that may be soluble in specific solvents or in a range of solvents (e.g., metal salts). The selection of materials may depend on factors such as the relative activity of the metals for an intended function, their availability, cost, and solubility limit. The selection of materials may also depend on compatibility with equipment and any special handling considerations, such as the corrosiveness of the solution or gases that may be generated during drying or heat treatment processes. The corrosive nature of such gases and methods of handling are discussed in further detail later in at least the section titled "Removal of Hazardous Compounds from Heat Treatment Effluent Gases".

For the examples described herein, metal oxide beads (alumina, $Al_2O_3$) and/or powder (ceria, $CeO_2$) were used as the porous material, but any suitable porous material may be used depending on the intended use or function for the porous material treated in accordance with various embodiments of the present disclosure. Lanthanum nitrate (La $(NO_3)_3$) powder and deionized water were used to prepare a lanthanum solution. A commercially available solution of ruthenium nitrosyl nitrate ($Ru(NO)(NO_3)_3$) with about 12 wt % ruthenium metal with respect to the total weight of the commercial solution was used.

Material Preparation

At block 104, the material is prepared. In some cases, the porous material may be used in an "as-delivered" or "as-received" condition, provided that it meets any requirements or desired specifications and there is no visible sign of contamination or damage. In some instances, the porous material may be subjected to a drying procedure to remove any moisture, if the porous material is hygroscopic. The metals to be applied to the porous material may be in the form of compounds or salts that are soluble in solvents such as water or an organic alcohol. In some cases, these metal compounds may be the nitrate, nitrosyl nitrate, or chloride salts of the metal. In some instances, it may be more convenient and more repeatable to purchase prepared, concentrated solutions from commercial suppliers. In some cases, these solutions may also contain an acid to enhance the stability and solubility of the metal compound in solution. In some instances, the acid used may contain an anion (e.g., $Cl^-$, $NO_3^-$, or $SO_4^{2-}$) that is the same as an ion of the metal compound (a common ion) or the same as a ligand of the metal compound (a common ligand). The acid and the metal compound having a common ion and/or a common ligand can benefit from, for instance, the common ion effect, which shifts equilibrium properties when one or more species in a reaction is shared with another reaction. The amount of solution required for doping the porous material may be calculated from the mass and pore volume of the porous material, the concentration of the metal compound(s) in solution, and the desired loading of the metals applied to the porous material. Further details of this process are provided later in at least the sections titled "Application of Dopants" and "Doping Conditions". If a large structured support is to be used as the base for a finished product, in some cases it may be possible to purchase a structured support that is already coated with a layer of the desired porous material. In some cases, it may be necessary to use experimentation to develop a suitable washcoat formulation to achieve the desired coverage of the large support structure with a desired porous material, but many different washcoating methods and formulations are well known in the industry. Washcoats are further discussed in more detail later in at least the section titled "Washcoating".

In examples described herein, the porous materials were used in their "as-delivered" or "as-received" form provided by a commercial supplier. Lanthanum nitrate solutions were prepared to a concentration required to apply about 5 mol % or about 15 mol % La to the alumina beads, using incipient wetness impregnation. The concentration of the ruthenium nitrosyl nitrate solution was adjusted with dilute nitric acid (to maintain approximately the same concentration of nitric acid as in the original solution) and deionized water, sufficient to apply about 2 wt % Ru to the alumina beads. A similar process was followed to prepare a solution to apply about 2 wt % Ru to the ceria powder as the porous material.

Application to Porous Material

At block 106, the metal compound is applied to the porous material. The metal compound solutions may be applied to the porous material by any convenient method. Wet impregnation and incipient wetness impregnation (IWI) are convenient and widely used for this purpose. In some cases, the porous material may be immersed in a solution of one or more metal compounds for several hours. In some cases, the solution may comprise only one metal. In some cases, the solution may comprise more than one metal (termed co-impregnation or co-deposition). In some instances, the solution may be dripped, poured, or sprayed onto the porous material-which may be especially convenient for incipient wetness impregnation of beads and pellets in a tumbling mixer (e.g., rotary evaporator) or a structured support. Further details of this process are provided later in at least the sections titled "Application of Dopants" and "Doping Conditions".

In examples described herein, sequential incipient wetness impregnation was used to separately apply a solution comprising lanthanum nitrate and a solution comprising ruthenium nitrosyl nitrate. Applying these solutions separately meant that a drying step and/or a heat treatment step was required between the application of the lanthanum and the application of the ruthenium. For larger samples, a rotary evaporator was used, with the solution dripped onto the tumbling porous beads. For smaller samples, all of the impregnations were performed in a small beaker.

Drying Step (Optional)

At block 108, the porous material is optionally dried. In some cases, a drying step may be used to control evaporation of the solvent. In some cases, this may be useful to reduce the risk of rapid, uncontrolled boiling of solvent trapped in pores of the porous material. In some instances, this may prevent the destruction of the pore structure or macrostructure of the porous material. In some cases, this may prevent the loss of the applied metal compound as a dissolved material that is expelled with rapidly boiling solvent before the metal compound fully adsorbs to the surface of the porous material. The optional drying process is further discussed in more detail later in at least the section titled "Drying Conditions for the Doped Porous Material".

For examples described herein, a drying step was used after each incipient wetness impregnation. For larger samples, this may be performed for about 4-6 hours at about 70° C., in vacuo, using a rotary evaporator. For smaller samples, the beaker may be left in a ventilated oven for about 4-6 hours at about 70° C.

Heat Treatment

At block 110, the porous material is heat treated. Heat treatment can be used to convert the metal compound(s) applied to the surface of the porous material into a desired form (e.g., elemental metal) to improve the performance of the finished product for an intended use. In some instances, the conditions used in the heat treatment step may be selected to promote the formation of solid solutions of the applied metals on or in the surface of the porous material, including pores and pore walls of the porous material. In some cases, a calcination step may be performed to convert the metal compound(s) to metal oxide(s). In some cases, a reduction step may be used to convert the metal compound(s) to the elemental form of the metal(s). In some cases, an annealing step or a nitriding step may also be used. Heat treatment is further discussed in more detail later in at least the sections titled "Calcination", "Annealing", "Nitriding", and "Reduction of the Porous Material". In any of these heat treatment steps, hazardous compounds may be evolved during the decomposition of the applied metal compound(s) and their conversion to the desired form of the metal(s). Hazardous gases, for example, should be treated to prevent exposure to workers and the environment. Removal of such hazardous compounds is further described in more detail later in at least the section titled "Removal of Hazardous Compound from Heat Treatment Effluent Gases".

For examples described herein, a calcination step was performed after impregnation of the porous material with lanthanum nitrate and the drying step. The conditions used for the calcination step were about 4 hours at 600° C. in a flowing stream of air, using a rotating glass tube. After impregnation with ruthenium nitrosyl nitrate and another drying step, a reduction step was performed. The conditions used for the reduction step were about 4 hours at 600° C. in a flowing stream of a reducing gas comprising hydrogen and nitrogen, using a rotating glass tube. During the heat treatment steps, there is a risk of forming NOx compounds during the decomposition of the impregnated compounds. Because of this, the exhaust gases from the heat treatment furnace are passed through a concentrated scrubbing solution of sodium carbonate. Possibly because of the presence of nitric acid in the ruthenium nitrosyl nitrate solution, the evolution of NOx during the reduction step can be greater than for lanthanum nitrate during the calcination step.

Cooling and Passivation

At block 112, the porous material is cooled and undergoes passivation. After the heat treatment step at block 110 is completed, the porous material and impregnated metals may be allowed to cool in a flowing stream of the same gases used for the heat treatment. The reason for this is that the heat treatment step was used to generate a particular form of the metal(s) (e.g., oxide, carbonate, hydroxide, nitride, or elemental form). Therefore, changing the atmosphere to, for example, air while the impregnated porous material is too hot may promote the further reaction (e.g., oxidation) of the metal(s) or metal compound(s), which may result in a loss of (or have an adverse effect on) the improved or modified characteristics desired for the porous material treated in accordance with the method steps illustrated in FIG. 1. One exception to this would be calcination in air, where there may be no need to change the composition of the gas stream. For examples described herein, the treated porous material was allowed to cool to about 50° C. before any change of gas composition and subsequent removal of the porous material from the furnace. The cooling and passivation steps are further described in more detail later in at least the sections titled "Calcination", "Annealing", "Nitriding", and "Reduction of the Porous Material".

In some embodiments, the porous material treated with a processing solution in accordance with various embodiments of the present disclosure may be a catalyst comprising a metal material, a promoter material, a dopant material and/or a support material. In some cases, the metal material may comprise, for example, nickel, rhodium, rhenium, ruthenium, iridium, cobalt, molybdenum, iron, platinum, chromium, palladium, manganese, tungsten, vanadium, zinc or copper. In some cases, the metal material may comprise active metal nanoparticles. The active metal nanoparticles may facilitate an ammonia decomposition reaction as described herein, and may be fabricated by loading a given precursor onto a porous material (e.g., a support comprising alumina, zirconia, silica, silicon carbide, or carbon), or a modified carrier (e.g., a composite support, modified support or doped support comprising alumina, zirconia, silica, silicon carbide, or carbon), and performing a reduction step at a high temperature. In some cases, the promoter material may comprise, for example, sodium, potassium, rubidium, cesium, magnesium, calcium, strontium, or barium. In some cases, the porous material may comprise a material having a chemical formula of $Al_xO_y$, $Mg_xO_y$, $Ce_xO_y$, $Si_xO_y$, $Ti_xO_y$, $Y_xO_y$, $Zr_xO_y$, $B_xN_y$, $Si_xC_y$, $Si_xN_y$, or C, where x and y are values greater than or equal to 1. In some cases, the porous material may comprise, for example, alumina ($Al_2O_3$), magnesia (MgO), ceria ($CeO_2$), silica ($SiO_2$), silicon carbide (SiC), carborundum, titania ($TiO_2$), yttria ($Y_2O_3$), zirconia ($ZrO_2$), silicon nitride (SiN), silicon nitride or nierite ($Si_3N_4$), magnesium aluminum oxide or spinel ($MgAl_2O_4$), krotite or dmitryivanovite ($CaAl_2O_4$), cobalt (II) aluminate or cobalt aluminum oxide ($CoAl_2O_4$), one or more natural or synthetic zeolites (e.g., MFI zeolite, MCM-41 zeolite, Y-type zeolite, X-type zeolite), hexagonal boron nitride (hBN), one or more boron nitride nanotubes (BNNT), hexagonal borocarbonitride (hBCN), one or more borocarbonitride nanotubes (BCNNT), or one or more carbon nanotubes (CNT). In some cases, the porous material may comprise, for example, aluminum (Al), iron (Fe), carbon (C), silicon (Si), titanium (Ti), tantalum (Ta), platinum (Pt), palladium (Pd), nickel (Ni), nickel-chromium (Ni—Cr), Nicralloy (Ni—Cr—Al), Fecralloy (Fe—Cr—Al—Y), Field's metal (In—Bi—Sn) based metal foams, monoliths, or engineered sheets, foils, or mesh designs.

In some cases, the porous material—before, after, or during treatment with a processing solution in accordance with various embodiments described herein—may comprise an amorphous, monoclinic, tetragonal, hexagonal, isomeric, or perovskite phase or structure.

Porous Material Form Factor

In some cases, the porous materials of the present disclosure may comprise any type of a porous material. In some cases, the porous material may comprise a bead, a cylindrical pellet, a powder, a monolith, a foam, a mesh, or any combination thereof. In some cases, the use of a larger, engineered support geometry may lead to improved gas flow, distribution, and reduced pressure drop. In some instances, the bead or pellet may have a critical dimension (e.g., a diameter or length). In some cases, the critical dimension may range from 0.1 mm to about 10 mm. In some cases, the critical dimension may range from about 10 mm to about 100 mm. In the case of a cylindrical pellet, for example, the critical dimension may be a diameter measured in a cross-section perpendicular to the longitudinal axis of the cylindrical pellet, or it may be a length measured from one end face of the pellet to an opposing end face of the pellet parallel to the longitudinal axis. In some instances, the bead or pellet may have a specific surface area ranging from about 50 $m^2/g$ to about 1200 $m^2/g$.

Application of Dopants

There are many techniques for the application of metal(s), metal oxide(s), and their precursor(s) (e.g., dopant(s)) onto the surface of a porous material, to form a composite, modified or doped porous material. Such techniques include, but are not limited to, wet impregnation, incipient wetness impregnation, template ion exchange, precipitation, sol-gel, citric acid process, deposition-precipitation, hydrothermal synthesis, chemical vapor deposition (CVD), physical vapor deposition (PVD), galvanic exchange, ferromagnetic inductive heating, and nanoparticle transfer. Wet (or wetness) impregnation may be a convenient technique, especially for laboratory preparations, and the procedure is described herein as an example. Other techniques may also be used to treat the -porous materials in accordance with various embodiments described herein and should be considered as included by this disclosure. In some cases, the composite, modified, or doped porous material may be subsequently treated with a processing solution in accordance with various embodiments described herein.

Dopant(s) may be applied to a surface of a porous material using separate solutions, with a drying step(s) between each application (sequential deposition or impregnation), or as a mixed solution of dopant metal precursor(s) (co-impregnation or co-deposition). Mixed dopant and precursor solutions may be understood to produce improved porous material characteristics for a finished product that is a catalyst. When applying solutions of mixed dopant precursors, it is important to ensure compatibility between the dopant precursors to avoid unintentional precipitation. Alternatively, precipitation may be induced within the pore structure of a porous material via sequential deposition of a dopant precursor followed by a precipitant. A promoter/precipitant precursor may also be included at this stage (e.g., KOH or CsOH). This may lead to potential morphological control over the final surface overlayer and/or better inclusion of the precipitant (often also a promoter, e.g., K or Cs) into the pore structure of the porous material.

To dope the porous material with dopant metal(s) to form a doped porous material or doped support, an aqueous solution of the chosen dopant metal precursor(s) (e.g., cobalt nitrate, ammonium molybdate, cobalt molybdate, magnesium chloride, cerium acetate) may be prepared, using water (e.g., deionized, distilled, or tap water). The mass of each dopant metal precursor(s) may be chosen to provide the desired metal loading on the porous material, and the volume of solvent water may be chosen to be about equal in mass to the porous material, prior to deposition. The metal loading on the porous material may be expressed as a molar ratio of the dopant metal(s) (e.g., Co, Mo, Mg, La, or Ce) to the support material or the primary metal in the support (e.g., $Al_2O_3$, C, SiC, $SiO_2$, $ZrO_2$, Al, Si, or Zr), and may range from about 0.1:1 to about 15:1. The desired loading of each dopant metal(s) on the support may require a dopant metal solution concentration of between about 0.1 Molar (M) and about 10M with respect to each dopant metal. The pH of the dopant metal precursor solution may also be adjusted (with a suitable strong acid or base) to improve the effectiveness of the doping process, or the dopant metal precursor may be dissolved in a suitable, pre-prepared solution of an acid or base (e.g., 0.01M to 20M nitric acid, hydrochloric acid, acetic acid, sodium hydroxide, or potassium hydroxide).

In some instances, the pH of the dopant solution may range from about −1 to about 7. In some cases, the pH of the dopant solution may range from about 7 to about 14.

In some instances, the concentration of the acid or base in solution may range from about 0.1M to about 30M, about 0.5M to about 20M, or about 1M to about 10M, In some cases, the concentration of the acid or base in solution may range from about 0.1 wt % to about 30 wt %, about 0.5 wt % to about 20 wt %, or about 1 wt % to about 10 wt %, with respect to the total mass of the solution. The porous material can be immersed in the precursor solution for a duration of up to about 48 hours at ambient temperature (e.g., about 20 to about 30° C.). The volume of the solution is selected to be at least equal to the approximate total pore volume of the porous material-when these values are about equal, it is termed "incipient wetness impregnation" (IWI). A greater volume of solution may be unnecessary (as shown in FIG. 2) and may reduce the efficiency of the doping process, but a greater volume of solution may be used when doping a porous material that is a structured or monolithic catalyst support.

At conclusion of the immersion time, the doped (wet) porous material may be transferred to suitable equipment to remove or evaporate the solvent. A rotary evaporator (or rotovap) is a convenient and efficient apparatus to facilitate the removal of solvent at moderate temperatures (e.g., between from about 20° C. to about 80° C.) and at pressures below atmospheric pressure or in vacuo. The doped (wet) support may also be dried in a laboratory oven under vacuum or at a pressure above atmospheric pressure, in which case higher temperatures (e.g., between from about 80° C. to about 150° C.) and drying times may be required. Drying the support in a laboratory oven may also be performed as a supplemental step, before or after drying in other equipment (such as a rotary evaporator). Each drying step may be performed for up to 168 hours, depending on the conditions used.

Figure 2:
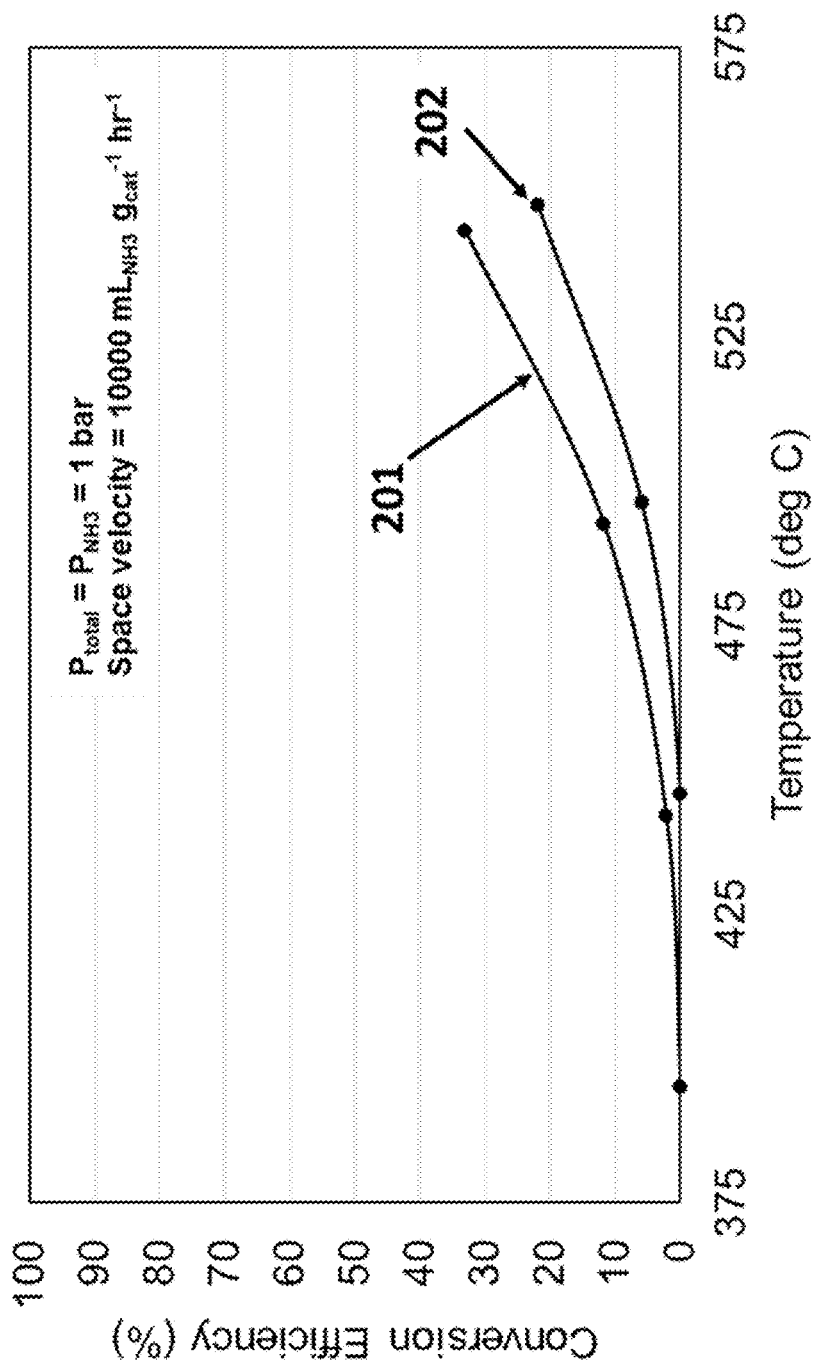
FIG. 2 illustrates a comparison of catalysts prepared using different porous materials comprising alumina, with and without addition of a rare earth metal, in accordance with various embodiments of the present disclosure.

With respect to FIG. 2, two catalysts were prepared with the same loading of ruthenium (about 2 wt % with respect to the alumina washcoat) and the same alumina-washcoated SiC support material, but slightly different impregnation methods. The catalyst prepared using incipient wetness impregnation (line 201) exhibited greater ammonia conversion or conversion efficiency than the catalyst prepared with excess solution (line 202).

Doping Conditions

In some embodiments, the dopant metal precursor(s) may be applied to the surface of the porous material as one solution comprising a water-soluble metal salt wherein the anions may comprise a member of the group: $NO_3^-$, $Cl^-$, $CO_3^{2-}$, $HCO_3^-$, $SO_4^{2-}$, or $CH_3COO^-$. In some embodiments, the dopant metal precursor(s) may be applied to the surface of the porous material as one solution comprising a water-soluble metal ligand complex with ammonia (e.g., ammonium molybdate, $(NH_4)_6Mo_7O_{24}$). The solution can include, for example, water and/or an organic alcohol as solvent.

In some embodiments, the concentration of the dopant metal precursor solution may range from about 0.01M to about 20M, about 0.01M to about 10M, about 0.01M to about 5M, 0.1M to about 20M, about 0.1M to about 10M, about 0.1M to about 5M, about 0.5M to about 10M, or about 0.5M to about 5M with respect to each dopant metal precursor compound.

In some cases, the concentration of the dopant metal solution may range from about 0.01 wt % to about 25 wt %, about 0.01 wt % to about 10 wt %, about 0.01 wt % to about 5 wt %, about 0.01 wt % to about 1 wt %, about 0.1 wt % to about 25 wt %, about 0.1 wt % to about 10 wt %, about 0.1 wt % to about 5 wt %, about 0.5 wt % to about 10 wt %, about 0.5 wt % to about 5 wt %, about 1 wt % to about 10 wt %, or about 1 wt % to about 5 wt % of the dopant metal precursor compound, with respect to the total mass of the solution. The porous material (e.g., support) may be contacted with the precursor solution for at least about 1, at least about 2, at least about 3, at least about 4, at least about 8, or at least about 12 hours.

Drying Conditions for the Doped Porous Material

In some cases, the drying step may include maintaining the porous material at a temperature of at least about 40° C., at least about 50° C., at least about 60° C., at least about 70° C., at least about 80° C., at least about 90° C., or at least about 100° C. In some instances, the drying step may include maintaining the porous material at a pressure below about 1 Bara, below about 0.1 Bara, below about 0.01 Bara, or below about 0.001 Bara. In some cases, the duration of the drying step is at least about 1 hour, at least about 2 hours, at least about 4 hours, at least about 8 hours, or at least about 12 hours.

In some embodiments, if separate dopant solutions are to be used, or if a promoter precursor solution was not added during the dopant application process (e.g. incipient wetness impregnation), then the application process and the drying step may need to be repeated for each dopant and/or promoter precursor solution. In some cases, the porous material may be subjected to heat treatment (e.g., calcination or annealing) between the application of separate dopant and/or promoter precursor solutions. Once all of the desired dopant metals have been applied to the porous material, then the porous material may be subjected to further heat treatment, including but not limited to calcination, annealing, or nitriding. The heat treatment step(s) may be performed before the active metal precursor (e.g., a processing solution as described herein) is applied to the surface of the doped porous material. The heat treatment step(s) may also be performed before a promoter precursor is applied to the surface of the doped porous material, in which case the drying step(s) and/or the heat treatment step(s) may need to be repeated before the active metal precursor is applied to the surface of the doped porous material.

Porous Material Monoliths and Substrates

In some cases, the porous material may be a monolith support or substrate. Monolith supports may be preferred for mobile and transport applications, as they may offer some advantages compared to pellets, beads, and powders (e.g., lower back pressure, higher mechanical strength, increased resistance to fragmentation and attrition losses). Monolith supports may be formed from many materials, including metals, metal alloys, and ceramics. They may be fabricated using many techniques, including stamping, extrusion, folding, corrugating, foaming, extrusion, casting, 3-D printing, and additive manufacturing.

In some instances, the monolith support may be metallic. Metallic monolith supports or substrates may comprise several thin metal sheets or metal foils, which may be corrugated or remain flat. To provide channels through which reacting gases can pass, these metallic sheets may be perforated and/or formed or stamped into more complex shapes (e.g., spirals, concentric tubes, or "honeycomb" structures), which can be inserted into a metal container. Metallic monolith supports may be designed to have an increased geometric surface area and reduced back pressure. To strengthen the metallic monolith structure, the metallic plates, metallic sheets, or metallic foils can be brazed/welded together to improve mechanical durability and increase their resistance to rapid changes in temperature or uneven heating (e.g., thermal shock).

In some instances, the monolith support may be ceramic. Ceramic monoliths may be a lower cost alternative to metallic monoliths but may also possess lower mechanical strength and resistance to attrition and thermal shock. Ceramic monoliths may be formed (e.g., by extrusion) into honeycomb structures with cells of regular or irregular shapes (e.g., circular, oval, ellipsoidal, triangular, square, oblong, rectangular, trapezoidal, or hexagonal). The size and density of the cells may be designed to improve performance for a specific function and to accommodate the choice of catalytic materials. The density of cells through the monolith may range from about 10 to more than about 1000 cells per square inch (cpsi), although a range from about 200 to about 600 cpsi is often used in automotive applications. Depending on the choice of material and method of manufacture, ceramic monoliths may be highly porous, or have low porosity, and they may be electrically conducting or insulating. In some cases, a non-metallic cellular monolith may comprise a rigid foam made of cordierite, or silicon carbide. Compared to ceramic or metal honeycomb monoliths, these foam products can have lower geometric surface areas and/or create higher back pressure. These rigid foam substrates may be used for specialist applications.

Compared to smaller form factors (e.g., beads or pellets), ceramic monoliths may have a smaller number of relatively large pores and a lower specific surface area. Metallic monoliths may be designed to achieve a higher specific surface area, but they have very low porosity. To remedy these deficiencies, a monolith substrate may be further processed by thermal and/or chemical treatment, or by the application of a washcoat.

Surface Treatment of Monolith Substrates

Monolith supports or substrates may be chemically and/or thermally treated to improve or modify their surface characteristics as catalyst supports, or to improve adhesion of a washcoat. Monolith supports or substrates may be subjected to high temperature treatment, such as calcination or nitriding to form oxides or nitrides on the surface. A washcoated monolith, in addition to other porous materials described herein, may serve as the porous material impregnated with a processing solution in accordance with aspects of various embodiments described herein.

These high temperature treatments may need to be performed in the range of from about 900° C. to about 1300° C., or about 1000° C. to about 1200° C. The high temperature treatment may be performed by heating in a furnace, by applying a flame directly to the surface (e.g., acetylene torch), or by using resistive (Joule) heating with electrically conducting monoliths. In some cases, a monolith support with a resistance of about 5 to about 100 ohms ($\Omega$) may be heated to at least about 900° C. using a laboratory power source that provides about 24 to about 36 volts (V). The electrical power may need to be applied as short pulses (e.g., from a few milliseconds to less than 1 second) to avoid overheating the monolith substrate. Using this type of resistive heating, a film of oxide or nitride material may be observed to form over the surface of the monolith in about 5 to about 30 minutes.

Washcoating

Catalyst activity and performance may be increased by using highly porous support materials, or carriers, with high specific surface areas. Monolith supports rarely have both of these features, so their characteristics are improved by depositing a layer of material (a "washcoat") onto the inner surfaces of the monolith. The washcoat may comprise metal oxide(s) and/or inorganic oxide(s) that form a high surface area coating (e.g., greater than about 100 m$^2$/g). The washcoat layer may comprise at least one of: alumina, $Al_2O_3$, aluminum oxide, silica, $SiO_2$, silicon dioxide, titania, $TiO_2$, titania dioxide, ceria, $CeO_2$, cerium dioxide, zirconia, $ZrO_2$, zirconium dioxide, $VO_2$ (vanadium dioxide), vanadia, $V_2O_5$, vanadium pentoxide, lanthana, $La_2O_3$, lanthanum oxide, nickel oxide, NiO, $Ni_2O_3$, zinc oxide, ZnO, or zeolites. The washcoat layer may comprise at least one of: iron oxide, wüstite, ferrous oxide, FeO, ferric oxide, $Fe_2O_3$, hematite, maghemite, $Fe_3O_4$, magnetite, magnesia, MgO, magnesium oxide, manganosite, MnO, manganese oxide, bixbyite, $Mn_2O_3$, hausmannite, $Mn_3O_4$, pyrolusite, $MnO_2$, manganese dioxide, birnessite, buserite, or psilomelane. In some embodiments, other catalyst materials (e.g., porous material surface modifiers, promoters, active metals) may be deposited on the surface and inside the pores of the washcoat layer. In some instances, the thickness of the washcoat layer may comprise from about 5 to about 150, about 5 to about 100, about 5 to about 75, about 5 to about 50, about 10 to about 150, about 10 to about 100, about 10 to about 75, or about 10 to about 50 microns ($\mu$m), but it may be difficult to maintain a constant layer thickness throughout the monolith. In some cases, another layer may be deposited before (i.e., underneath) the washcoat to coat sharp corners or edges of the monolith, thereby preventing or reducing excessive washcoat deposition in the sharp corners or edges. The specific surface area of the washcoat (or finished catalyst) is typically determined by nitrogen or argon adsorption/physisorption measurements with mathematical modeling, known as the BET (Brunauer, Emmet, and Teller) method.

Calcination of the Porous Material

The chemical composition of the surface of the porous material can be modified, or thermally activated, to further improve the characteristics and properties of the porous material, including for cases where the porous material will be, for example, a catalyst. Such modifications may be used to improve or moderate the dispersion of active metal species, and/or the surface morphology, selectivity, activity, or temperature sensitivity of the porous material. One such modification is calcination, which is performed at elevated temperatures, with the objective of converting up to 100% of the precursor species on the surface to the metal oxides. The elevated temperatures may also be selected to promote solid state reaction(s) between the porous material and/or the metal dopants and/or promoters to form solid solutions or alloys that may further improve the desired characteristics and performance of a catalyst comprising the porous material. In some cases, calcination may be used to process active metal precursor(s) deposited on the porous material, or doped porous material, to convert the active metal precursor(s) to nanoparticles of elemental active metal(s). In some cases, calcination may be used to process active metal precursors deposited on the porous material, or doped porous material, for conversion to nanoparticles of active metal oxide(s), or as a preliminary treatment step towards forming nanoparticles of elemental active metal. For some active metals, their oxides may be more effective as a catalyst for certain reactions. An oxidizing or inert (i.e., non-reducing) atmosphere, e.g., an atmosphere comprising air, $O_2$, $N_2$, $CO_2$, Ar, He, or Xe (or mixtures thereof), may be used. Once the high temperature heat treatment has reached the end of the desired time duration, the calcined material remains in the oven and in the same atmosphere, and it is allowed to cool to ambient temperature over a period of several hours.

In some embodiments, the porous material may be maintained at a temperature ranging from about 200° C. to about 900° C., from about 300° C. to about 800° C., from about 400° C. to about 700° C., or from about 500° C. to about 600° C., in an oxidizing (e.g., comprising at least oxygen) or an inert atmosphere.

In some cases, the porous material may be maintained at the desired temperature for a duration of at least about 1 hour, at least about 2 hours, at least about 3 hours, at least about 4 hours, at least about 8 hours, or at least about 12 hours, in an oxidizing (e.g., comprising at least oxygen) or an inert atmosphere.

Annealing of the Porous Material

The chemical composition of the surface of the porous material can be modified, or thermally activated, to further improve the characteristics and properties of the porous material, for example, for use as a catalyst. Such modifications may be used to improve or moderate the dispersion of active metal species, and/or the surface morphology, selectivity, activity, or temperature sensitivity of the catalyst. One such modification is annealing, which is performed at elevated temperatures, with the objective of modifying the crystal structure, size, or composition of the surface layers. In some cases, annealing may be performed to agglomerate smaller particles to combine into larger particles and expose a larger area of the surface of the porous material. The elevated temperatures may also be selected to promote solid state reaction(s) between the porous material and/or the metal dopants and/or promoters to form solid solutions or alloys which further improve the desired characteristics and performance of the final porous material, for example, for use as a catalyst. In some cases, annealing may be used to process certain active metal precursors deposited on the porous material, or doped porous material, to convert the precursors to elemental active metal and control the growth of nanoparticles. In some cases, annealing may be used to process certain active metal precursors deposited on the porous material, or doped porous material, to convert them to another active metal compound, controlling the growth of nanoparticles as a preliminary treatment step towards forming elemental active metal. An inert or reducing (i.e. non-oxidizing) atmosphere, e.g., comprising any of $N_2$, $CO_2$, CO, $H_2$, Ar, He, Xe (or mixtures thereof), may be used. Once the high temperature heat treatment has reached the end of the desired time duration, the annealed material remains in the oven and in the same atmosphere, and it is allowed to cool to ambient temperature over a period of several hours.

In some embodiments, the porous material may be maintained at a temperature ranging from about 200° C. to about 900° C., from about 300° C. to about 800° C., from about 400° C. to about 700° C., or from about 500° C. to about 600° C., in an inert or reducing atmosphere. In some instances, the porous material may be maintained at the desired temperature for at least about 1 hour, at least about 2 hours, at least about 3 hours, at least about 4 hours, at least about 8 hours, or at least about 12 hours.

Nitriding of the Porous Material

The chemical composition of the surface of the porous material can be modified, or thermally activated, to further improve the characteristics of the porous material, for example, for use as a catalyst. Such modifications may be used to improve or moderate the dispersion of active metal species and/or the surface morphology, selectivity, activity, or temperature sensitivity of the porous material for its intended use. One such modification is nitriding, which is performed at elevated temperatures, with the objective of converting up to 100% of the metal oxides or precursor species on the surface to the metal nitrides. The elevated temperatures may also be selected to promote solid state reaction(s) between the porous material and/or the metal dopants and/or promoters to form solid solutions or alloys that further improve the desired characteristics and performance of the porous material, for example, as a catalyst. In some cases, nitriding may be used to process certain active metal precursor(s) deposited on the porous material or doped porous material, for conversion of the active metal precursors to nanoparticles of active metal nitride(s). For some active metals, their nitrides may be more effective as a catalyst for certain reactions. A reactive, nitrogen-rich or nitrogen-containing atmosphere comprising e.g., $NH_3$, $H_2$—$N_2$, forming gas, or endothermic gas (or mixtures thereof), may be used. Once the high temperature heat treatment has reached the end of the desired time duration, the nitrided porous material remains in the oven and in the same atmosphere, and it is allowed to cool to ambient temperature over a period of several hours.

In some cases, the porous material may be maintained at a temperature ranging from about 200° C. to about 900° C., about 300° C. to about 800° C., about 400° C. to about 700° C., or about 500° C. to about 600° C., in a reactive, nitrogen-rich or nitrogen-containing atmosphere. In some instances, the porous material may be maintained at the desired temperature for at least about 1 hour, at least about 2 hours, at least about 3 hours, at least about 4 hours, at least about 8 hours, or at least about 12 hours, in a reactive, nitrogen-rich, or nitrogen-containing atmosphere.

Reduction of the Porous Material

As discussed above, once the active metal (e.g., Co, Ni, Fe, Ni, Ru) precursor is deposited on the porous material (e.g., via impregnating the porous material with a processing solution described herein), reduction of the precursor may lead to an improved active metal nanoparticle that can be used to facilitate, for example, ammonia decomposition. The conditions of such reduction may strongly influence the physical or chemical properties or characteristics of the active metal on the surface of the porous material, and thus the activity and/or ammonia conversion efficiency of a catalyst comprising the porous material. In some embodiments, the conditions of reduction may strongly influence properties of the active metal nanoparticles on the surface, including, for example, size, dispersion and dominant crystal facets. In some cases, the reduction step may be performed in-situ, once the catalyst has been loaded into, for example, a vessel such as a reactor or reformer, which can be especially effective if the elemental form of the active metal is sensitive to exposure to the atmosphere. The in-situ reduction step can be performed with a specific reducing gas (e.g., comprising $H_2$, $NH_3$, or CO), or on exposure to a process feed gas at the start of operation.

In some embodiments, the porous material may be maintained at a temperature ranging from about 200° C. to about 900° C., about 300° C. to about 800° C., 400° C. to about 700° C., or about 500° C. to about 600° C., in a reducing atmosphere comprising hydrogen.

In some embodiments, the porous material may be maintained at the desired temperature for at least about 1 hour, at least about 2 hours, at least about 3 hours, at least about 4 hours, at least about 8 hours, or at least about 12 hours, in a reducing atmosphere comprising hydrogen.

Incorporation of Dopant Metals

In some cases, the porous material may further comprise additional dopants to improve the characteristics and performance of the catalyst. Such dopants may comprise: an alkali metal, an alkaline earth metal, a lanthanum, lanthanide or lanthanoid series metal, a transition metal, a post-transition metal or a metalloid, selected from Group 1 to Group 16 and Row 2 to Row 6 of the periodic table. In some cases, the porous material may comprise an oxide of: an alkali metal, an alkaline earth metal, a lanthanum, lanthanide or lanthanoid series metal, a transition metal, a post-transition metal, or a metalloid, selected from Group 1 to Group 16 and Row 2 to Row 6 of the periodic table. In some cases, the porous material may comprise a nitride of: an alkali metal, an alkaline earth metal, a lanthanum, lanthanide or lanthanoid series metal, a transition metal, a post-transition metal or a metalloid, selected from Group 1 to Group 16 and Row 2 to Row 6 of the periodic table. In some cases, the porous material may comprise the elemental (or reduced) form of: an alkali metal, an alkaline earth metal, a lanthanum, lanthanide or lanthanoid series metal, a transition metal, a post-transition metal or a metalloid, selected from Group 1 to Group 16 and Row 2 to Row 6 of the periodic table.

Porous Material Surface Modifiers

In some embodiments, the porous material may comprise a porous material surface modifier. In some instances, the porous material surface modifier may comprise a rare earth metal. In some embodiments, the porous material surface modifier may comprise an F-block, lanthanum, lathanide, or lathanoid series element (La, Ce, Pr, Nd, Pm, Sm, Eu, Gd, Tb, Dy, Ho, Er, Tm, Yb, and Lu). In some embodiments, the porous material surface modifier may comprise lanthanum (La) and cerium (Ce). In some cases, the porous material surface modifier may comprise an alkaline earth metal. In some cases, the porous material surface modifier may comprise Mg, Ca, Sr, or Ba. In some cases, the porous material surface modifier may comprise Fe, Mn, Ni, or Zn. In some cases, the porous material surface modifier may comprise boron (B) and nitrogen (N).

In some instances, the porous material surface modifier may be incorporated into the surface layer of the porous material, to form a solid solution. In some instances, the porous material surface modifier may be incorporated into the surface layer of the porous material, to form a metal or metal oxide alloy. In some instances, the porous material surface modifier may be incorporated into the surface layer of the porous material, to modify the crystal structure. In some embodiments, the porous material surface modifier may combine with the porous material to form one or more perovskite, spinel, triclinic, monoclinic, orthorhombic, tetragonal, trigonal, hexagonal, isomeric, or cubic structure or phase. In some embodiments, the porous material surface modifier may combine with the porous material to form an amorphous structure or phase.

In some cases, the porous material may comprise a porous material surface modifier at a concentration ranging from about 0.1 wt % to about 20 wt %, about 0.5 wt % to about 15 wt %, about 1 wt % to about 10 wt %, or about 2 wt % to about 5 wt %, with respect to the total mass of the porous material and the porous material surface modifier.

In some cases, the porous material may comprise a porous material surface modifier at a concentration ranging from about 0.1 mol % to about 20 mol %, about 0.5 mol % to about 15 mol %, about 1 mol % to about 10 mol %, or about 2 mol % to about 5 mol %, with respect to the total number of moles of the porous material and the porous material surface modifier.

Porous Material Promoters

In some instances, the porous material may comprise a promoter selected from: Li, Na, K, Cs or Rb. In some instances, the porous material may comprise a promoter, selected from: Be, Mg, Ca, Sr or Ba. In some cases, the porous material may comprise a promoter, elected from: Fe, Co, Cr, Cu, Mn, Mn, Ni, or Zn. In some cases, the porous material may be essentially free of a promoter, an alkali metal, or an alkaline earth metal.

In some cases, the porous material may comprise a promoter at a concentration ranging from about 0.1 wt % to about 15 wt %, about 0.5 wt % to about 10 wt %, about 1 wt % to about 8 wt %, or about 2 wt % to about 6 wt %, with respect to the total mass of the porous material and the promoter. In some instances, the porous material may comprise a promoter at a concentration ranging from about 0.1 mol % to about 15 mol %, about 0.5 mol % to about 10 mol %, about 1 mol % to about 8 mol %, or about 2 mol % to about 6 mol %, with respect to the total number of moles of the porous material and the promoter.

Active Metals

In some embodiments, the porous material may comprise an active metal. In some instances, the active metal may comprise a platinum group metal and/or a noble metal. In some cases, the platinum group metal and/or the noble metal may comprise particles and/or nanoparticles. In some cases, the active metal may comprise a Row 4 ("early" or "light") transition metal (Sc, Ti, V, Cr, Mn, Fe, Co, Ni, Cu, or Zn). In some embodiments, the active metal may comprise a Row 5 ("middle" or "medium") transition metal (Y, Zr, Nb, Mo, Tc, Ru, Rh, Pd, Ag, or Cd). In some instances, the active metal may comprise a Row 6 ("late" or "heavy") transition metal (Hf, Ta, W, Re, Os, Ir, Pt, Au, or Hg). In some cases, the active metal may comprise an alkali metal and/or an alkaline earth metal. In some cases, the active metal may comprise B, C, Al, Si, P, Ga, Ge, Se, In, Sn, Sb, Te, Tl, Pb or Bi. In some cases, the active metal may comprise particles or nanoparticles of an alkali metal, an alkaline earth metal, or a metalloid.

In some instances, an active metal precursor may be applied to the porous material, separately or together, using CVD, PVD, wet impregnation, incipient wetness impregnation, or other suitable methods. In some embodiments, the active metal may be applied to the porous material as a precursor, using separate or mixed processing solutions. In some cases, the active metal precursor may comprise an active metal as soluble salt or complex, e.g.: a metal iodide, acetylacetonate, chloride hydrate, oxide hydrate, chloride, chlorate, perchlorate, nitrosyl nitrate, iodide hydrate, carbonyl, sulfate, ammine chloride, thiocyanate, organometallic compound (e.g., acetylacetonate, bis(cyclopentadienyl), cyclooctadiene chloride, ethyldiamine chloride, chloro(cyclopentadienyl)bis(triphenylphosphine), chlorotris(triphenylphosphine)acetate), or a metal nanoparticle colloid. In some embodiments, the active metal precursor may comprise: $Ru(NO)(NO_3)_3$, $Ru(NO_3)_3$, $RuCl_3$, $Ru_3(CO)_{12}$, ruthenium (III) chloride hexa-ammoniate $Ru(NH_3)_6Cl_3$, cyclohexadiene ruthenium tricarbonyl $((CHD)Ru(CO)_3)$, butadiene ruthenium tricarbonyl $((BD)Ru(CO)_3)$, and dimethylbutadiene ruthenium tricarbonyl $((DMBD)Ru(CO)_3)$.

In some embodiments, application of the active metal to the porous material may comprise a solid-state fusion process during a heat treatment step described previously herein. In some embodiments, this solid-state fusion process may comprise the formation of active metal particles or nanoparticles, comprising some or all of the active metal deposited onto the porous material. In some embodiments, the active metal particles or nanoparticles may comprise alloys or mixtures of more than one active metal.

In some embodiments, the porous material may comprise an active metal at a concentration ranging from about 0.1 wt % to about 15 wt %, about 0.1 wt % to about 10 wt %, about 0.1 wt % to about 5 wt %, or about 0.1 wt % to about 2 wt % with respect to the total mass of the porous material and the active metal.

In some embodiments, the porous material may comprise an active metal at a concentration ranging from about 0.1 mol % to about 15 mol %, about 0.1 mol % to about 10 mol %, about 0.1 mol % to about 5 mol %, or about 0.1 mol % to about 2 mol % with respect to the total number of moles of the porous material and the active metal.

Advantage of Using Rare Earth Metal Surface Modifier

In some embodiments, doping a porous material with a rare earth metal may result in improved performance or more desirable characteristics, compared with not using a rare earth metal. In the following examples, the concentrations of rare earth metals are expressed as mol %, with respect to the total number of moles of the porous material and the rare earth metal. The concentration of the active metal is expressed as wt %, with respect to the total mass of the porous material and the active metal.

Figure 3:
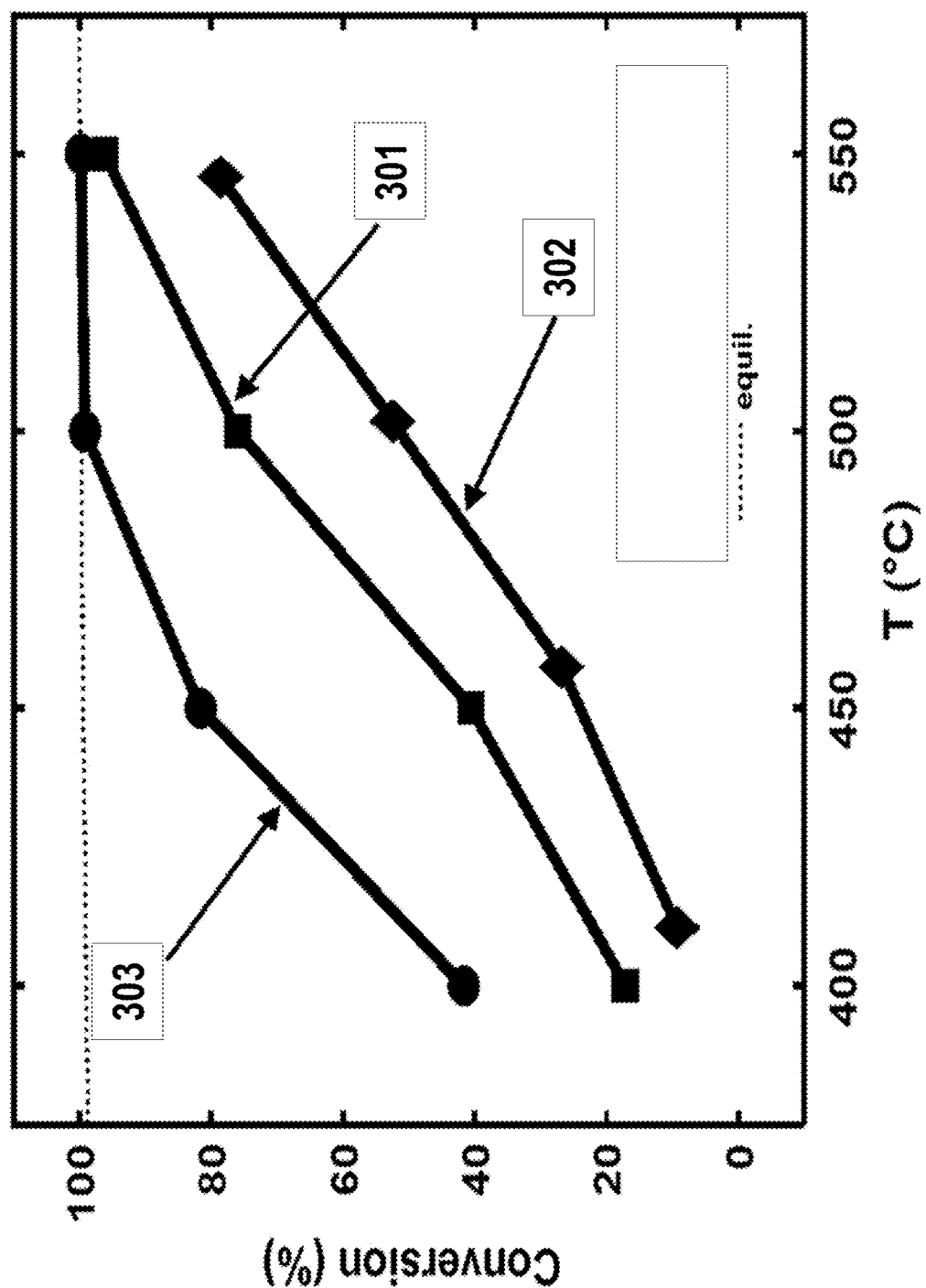
FIG. 3 illustrates a comparison of ammonia conversion efficiencies for various catalysts having different La:Ce molar ratios and variations in ammonia conversion efficiencies based on different operating temperatures, in accordance with various embodiments of the present disclosure.

With reference to FIG. 3, Ru-alumina catalysts were prepared using the same methods, materials, and porous material form factors described herein. All contained the same wt % of Ru with respect to the weight of the catalyst, but one of the catalysts was doped with a low concentration of a rare earth metal (less than 10 mol %). The test results showed that using a theta-alumina support 302 may give a catalyst with higher ammonia conversion efficiency than using a gamma-alumina support 301, but doping the theta-alumina support with a rare earth metal 303 may increase ammonia conversion efficiency still further.

In some cases, doping a porous material with a combination of two or more rare earth metals may result in improved performance compared to using only one rare earth metal. In the following examples, the concentration of rare earth metals are expressed as mol %, with respect to the total number of moles of the porous material and the rare earth metal. The concentration of the active metal is expressed as wt %, with respect to the total mass of the porous material and the active metal.

Figure 4:
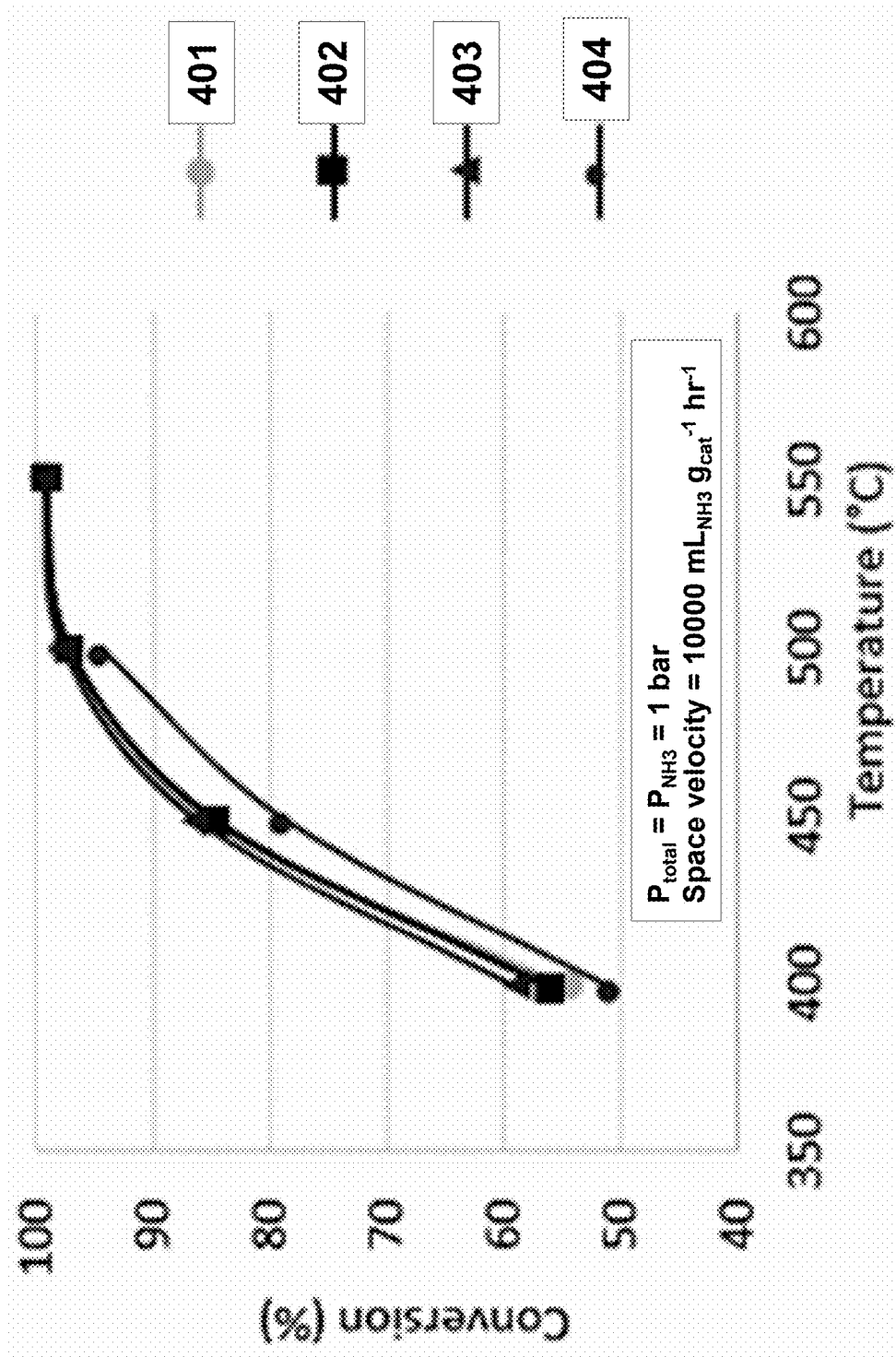
FIG. 4 illustrates the benefit of minimizing the amount of solvent during the wet impregnation of a porous material with a processing solution, in accordance with various embodiments of the present disclosure.

With reference to FIG. 4, Ru-alumina catalysts may be prepared with constant Ru concentration and about 15 mol % total rare earth metal content, according to the methods and materials described herein, based on theta-alumina (θ-alumina) and the same form factor for the support. The catalysts may comprise $Ru/La_{(1-x)}Ce_x$-Theta-$Al_2O_3$ with values for x of: x=0 (401, no Ce), x=0.1 (402), x=0.3 (403), or x=0.5 (404). The conversion efficiency of these catalysts may be measured across a temperature range and at constant $NH_3$ flow rate.

Effect of Excess Solvent Compared to Incipient Wetness Impregnation

In some instances, it may be advantageous to use a volume of impregnation solution that is greater than the approximate pore volume of the porous material. In the following examples, the concentrations of rare earth metals are expressed as mol %, with respect to the total number of moles of the porous material and the rare earth metal. The concentration of the active metal is expressed as wt %, with respect to the total mass of the porous material and the active metal.

Figure 5:
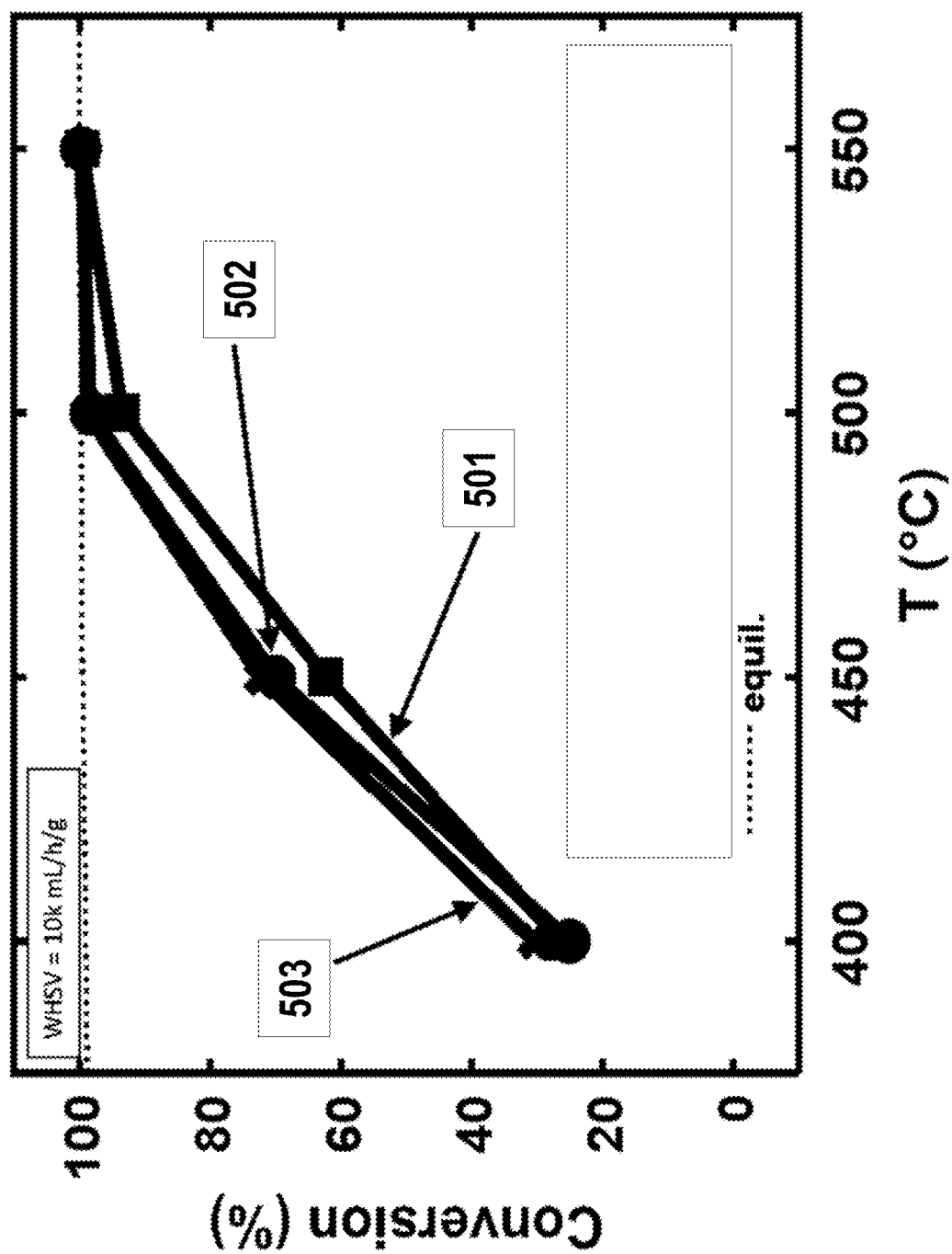
FIG. 5 illustrates the effect of processing solution volume on the ammonia conversion efficiency of catalysts containing different amounts of rare earth metal, in accordance with various embodiments of the present disclosure.

With reference to FIG. 5, Ru-alumina catalysts were prepared according to methods and materials described herein, and with the same porous material and form factor. The catalysts contained the same wt % of Ru as described previously and the same concentration of a rare earth metal (about 15 mol %). One catalyst (501) was prepared with a reduced volume of impregnation solution, approximately equal to the volume of the porous material (incipient wetness impregnation). The other two catalysts (502 and 503) were prepared with a volume of solution approximately 10% greater than the pore volume of the porous material, and with different Ru precursors. With reference to FIG. 5, the catalyst prepared using the incipient wetness technique (501) exhibited lower ammonia conversion efficiency than the two catalysts prepared with excess impregnation solution (502 and 503).

Improvement of Catalyst Performance with Lower Rare Earth Metal Content

In some cases, by reducing the volume of impregnation solution to that required for incipient wetness impregnation, catalysts prepared with lower concentrations of rare earth metals and without a promoter may, for example, result in improved ammonia conversion efficiency. In the following examples, the concentrations of rare earth metals are expressed as mol %, with respect to the total number of moles of the porous material and the rare earth metal. The concentration of the active metal is expressed as wt %, with respect to the total mass of the porous material and the active metal.

Figure 6:
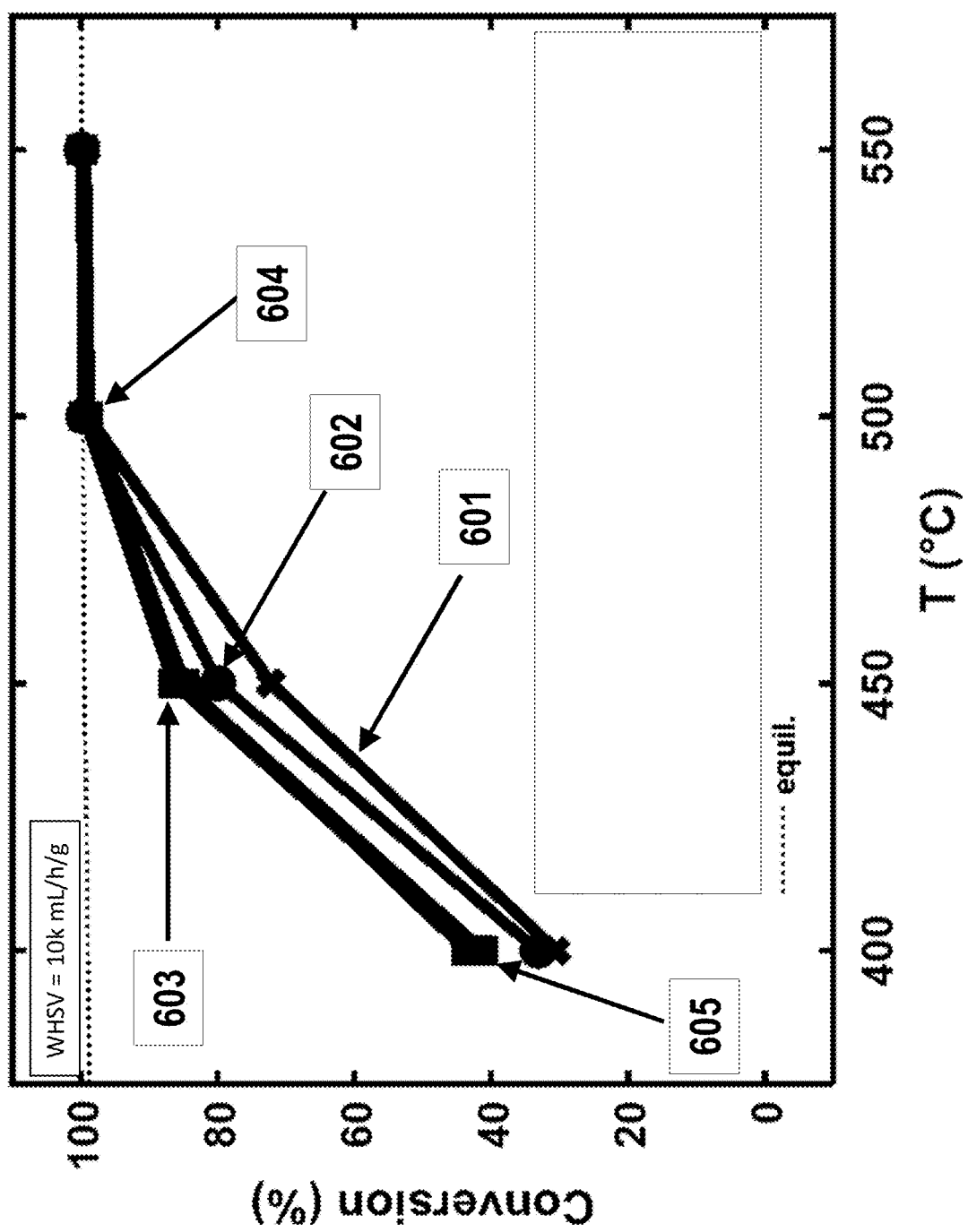
FIG. 6 illustrates the effect of processing solution volume on the ammonia conversion efficiency of catalysts containing different amounts of rare earth metals, in accordance with various embodiments of the present disclosure.

Ru-alumina catalysts were prepared according to methods and materials disclosed herein. The catalysts contained the same wt % of Ru described previously on identical theta-alumina porous materials with the same form factor. All the catalysts were prepared with heat treatment temperatures of about 600° C. for calcination and reduction steps. Catalysts prepared with lower rare earth metal content (for example, below 10 mol %) using the incipient wetness impregnation technique exhibited higher ammonia conversion efficiency than the same catalyst prepared with excess impregnation solution. Surprisingly, these catalysts also exhibited higher conversion efficiency than a similar catalyst containing about 15 mol % of lanthanum, prepared with excess impregnation solution. With reference to FIG. 6, Ru-alumina catalysts were prepared using the wet impregnation technique (excess impregnation solution), containing 15 mol % La (catalyst 601), and less than 10 mol % La (catalyst 602). Catalysts prepared using the incipient wetness technique (no excess impregnation solution) and containing less than 10 mol % La resulted in higher ammonia conversion efficiency. Almost identical performance was observed for catalysts 603 and 604 that were prepared with about 10-20 wt % (with respect to the total mass of the solution) nitric acid in the Ru precursor solution, and a catalyst 605 that was not prepared with nitric acid in the Ru precursor solution.

In some cases, Ru-alumina catalysts prepared using the incipient wetness impregnation technique and with relatively low rare earth metal content and without a promoter can exhibit equal performance to a high activity catalyst made with an improved combination of two rare earth metals and including an alkali metal promoter.

Ru-alumina catalysts were prepared according to methods and materials disclosed herein. The catalysts contained the same wt % of Ru described previously on identical theta-alumina porous materials with the same form factor. All the catalysts were prepared with heat treatment temperatures of about 600° C. for calcination and reduction steps.

In examples described herein, the concentrations of rare earth metals are expressed as mol %, with respect to the total number of moles of the porous material and the rare earth metal. The concentration of the active metal is expressed as wt %, with respect to the total mass of the porous material and the active metal.

Figure 7:
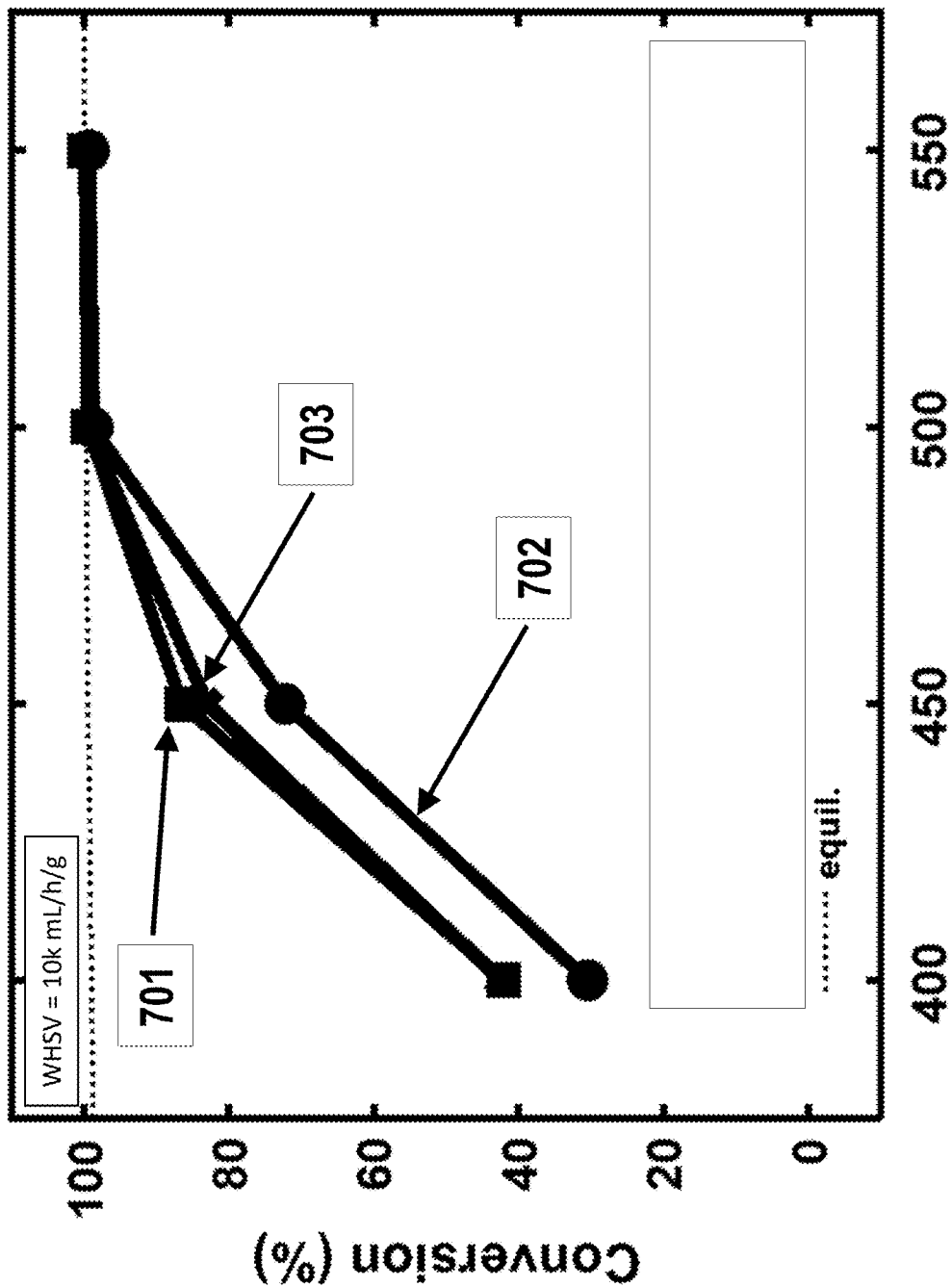
FIG. 7 illustrates the effect of processing solution volume on the conversion efficiency for various catalysts, in accordance with various embodiments of the present disclosure.

A catalyst prepared with relatively lower rare earth metal content using the incipient wetness impregnation technique exhibited higher ammonia conversion efficiency than the same catalyst prepared with excess impregnation solution. Surprisingly, the catalyst prepared using the incipient wetness technique exhibited equivalent conversion efficiency compared to a similar catalyst conforming to the improved composition of catalyst 404 (FIG. 4) and prepared with excess impregnation solution. With reference to FIG. 7, Ru-alumina catalysts were prepared using the wet impregnation technique (excess impregnation solution), containing 15 mol % of La and Ce (catalyst 703), and less than 10 mol % La (catalyst 702). A catalyst 701 prepared using the incipient wetness technique (no excess impregnation solution) and containing less than 10 mol % La gave higher ammonia conversion efficiency compared to catalyst 702 and equivalent performance to catalyst 703.

Potential Loss of Active Metals During Heat Treatment

In some cases, heat treatment of metal precursors under calcining or annealing conditions such as those described herein may also lead to the unintended formation of volatile compounds of the metals. These volatile metal compounds may then be transported from the surface of a porous material, a doped porous material, or a catalyst comprising the porous material or the doped porous material, and removed with the gas flow. This may represent a loss of metal from the porous material, and for a catalyst, it potentially represents a significant reduction or loss in catalytic activity from the expected value. The volatile metal compounds may also represent a potential health, safety, or environmental hazard. The active metal may be a rare earth metal, a noble metal, a platinum group metal, a transition metal, an alkali metal, an alkaline earth metal, or a Group III metal (e.g., aluminum). The metal may be part of a porous material, a porous material surface modifier, a promoter, or an active metal.

As many metals used for catalysts are rare and expensive (e.g., platinum group metals or noble metals), the evaporation of volatile compounds of these metals from, for example, a catalyst is a waste of limited natural resources and may represent a significant financial loss for the manufacturer or their customer. Even if a recovery system is used to trap metal compounds from the heat treatment gas, there is a cost associated with this and, potentially, an environmental impact from the additional processing required to reclaim the catalyst metals from the recovery processing streams. A solution to this problem is to prevent the formation and loss of the volatile metal compounds from the surface of a porous material, a doped porous material, or a catalyst comprising the porous material or the doped porous material.

Removal of Hazardous Compounds from Heat Treatment Effluent Gases

During heat treatment of porous materials, doped porous materials, or catalysts comprising porous materials or doped porous materials impregnated with metal precursors, hazardous compounds may be released as the metal precursors are converted to more stable metal oxides or nitrides. The hazardous compounds may often be in the form of vapor or gas (e.g., $N_2O$, $NO$, $NO_2$, $SO_2$, $H_2S$ and $HCl$), which must be captured and neutralized to maintain safety in the manufacturing facility, conform with environmental legislative, and regulatory requirements, and protect equipment from corrosion and degradation.

Several methods may be employed to mitigate the release of these hazardous compounds, but scrubbing techniques are commonly used. In some cases, the effluent gases from the heat treatment step may be passed through a scrubbing solution comprising a neutralizing compound. In some cases, the effluent gases from the heat treatment step may be passed through a scrubbing tower, where the gases are contacted with a moving liquid comprising a neutralizing compound. In some cases, the effluent gases from the heat treatment step may be passed through an absorber, where the hazardous species may be trapped permanently, or recovered from the absorbent material. In some instances, the effluent gases from the heat treatment step may be passed through a filter comprising a neutralizing compound. In some instances, the neutralizing compound may be designed specifically for use with the chemical species expected to be present in the heat treatment effluent gases. In some instances, the neutralizing compound may be selected for general acceptable performance with a variety of hazardous compounds. In some cases, the neutralizing compound is dissolved in a compatible solvent. In some cases, the neutralizing material is present as a deposited phase impregnated on a porous substrate (e.g., a filter or absorbent).

In some instances, the heat treatment effluent gases may include hazardous compounds that are acidic in nature and may require contact with an alkaline or basic medium to be neutralized effectively. In some instances, the heat treatment effluent gases may include hazardous compounds that are alkaline or basic in nature and may require contact with an acidic medium to be neutralized effectively. Alternatively, or if the hazardous compounds are neither acidic or basic, contact with non-ionic or organic media may also be used to capture these compounds, by reaction, binding, absorption, or adsorption.

In some cases, the neutralizing medium may include water as a solvent. In some cases, the neutralizing medium may include an alcohol, or oxygenated hydrocarbon as a solvent. In some cases, the neutralizing medium may include a polar organic compound as a solvent. In some cases, the neutralizing medium may include a non-polar organic compound as a solvent. In some cases, the neutralizing medium may include a mixture of solvents.

In some cases, the neutralizing medium may include a metal salt. In some cases, the metal salt may be a salt of an alkali metal, an alkaline earth metal, a Group III metal, or a transition metal. In some instances, the metal salt may include a carbonate, hydrogen carbonate, bicarbonate, hydroxide, cyanide, halide, nitrate, nitrite. In some instances, the metal salt may include a metal salt of an organic or fatty acid. In some cases, the neutralizing medium may include ashless (non-metal) compound containing nitrogen, oxygen, phosphorus, or sulfur, that acts as a Lewis base or a Brønsted-Lowry base (e.g., triethylamine, pyridine, acetonitrile, acetone, diethyl ether, ethyl acetate, tetrahydrofuran, dimethyl sulfoxide, tetrahydrothiophene, or trimethylphosphine).

In some cases, the metal salt or non-metal compound may be present in a concentration up to, or even beyond, its saturation point in solution or deposited on a solid material, to increase the effectiveness and duration of the neutralizing medium.

Mitigation of the Loss of Volatile Metal Compounds

If the heat treatment process conditions described herein promote the formation of volatile metal compounds, this may be detected as a change in appearance of the scrubbing solution. For example, after some time, a clear and homogeneous solution may change color, show signs of turbidity, or contain a suspended particulate material, due to contamination by, or reaction with, the volatile metal compounds. Surprisingly, it has been found that addition of certain chemicals to a processing solution for treating a porous material (e.g., impregnating a porous material) can mitigate the formation of these volatile compounds and a subsequent loss of metal from the surface of the porous material. These chemicals may be referred to herein as non-metal reductants or mitigation chemicals. Non-metal reductants or mitigation chemicals may be preferred to avoid potential unwanted interference with the metals in the processing solution, or potential contamination of the surface of a porous material, a doped porous material, or a catalyst comprising the porous material or the doped porous material.

While the mode of action is not clear, it seems that mitigation chemicals may be capable of preventing higher oxidation states of the metals of the processing solution. Therefore, non-metal and organic compounds that are mild reductants and exhibit weak basic or weak reducing (properties) may be suitable non-metal reductants or mitigation chemicals. Alternatively, the non-metal reductants or mitigation chemicals may interfere with a high temperature reaction between any acidic species on the surface of the porous material, doped porous material, or a catalyst comprising the porous material or doped porous material, and the impregnation metals. It is also possible that the mitigation chemicals may be hydrolyzed at elevated temperatures, in the presence of acidic or basic species in the processing solution or on the surface of the porous material, doped porous material, or a catalyst comprising the porous material or doped porous material, and potentially, it is the hydrolysis products that prevent the formation of the volatile metal compounds. In some instances, the volatile metal compounds may be compounds of the active metal species. In some instances, the active metal may be a platinum group metal. In some cases, the platinum group metal may be platinum, palladium, iridium, rhodium, osmium, or ruthenium. In some cases, the active metal may be a noble metal, such as gold, silver, technetium, or rhenium.

In some instances, the non-metal reductant or mitigation chemical may prevent the oxidation of the active metals to higher oxidation states (e.g., $Pt^{6+}$, $Pd^{4+}$, $Ir^{6+}$, $Rh^{6+}$, $Ru^{8+}$, $Os^{8+}$). In some cases, the non-metal reductant may be oxidized by the acid. In some cases, the reductant may be oxidized sacrificially, to prevent further oxidation of the catalyst metal. In some cases, the mitigation chemical may be a denitrating agent. In some cases, the denitrating agent may decompose nitric acid. In some cases, the mitigation chemical may be a Lewis base. In some cases, the Lewis base may react with Lewis acids.

It can be desirable for mitigation chemicals (or their hydrolysis products) to volatize and/or decompose at or below the drying and/or heat treatment temperatures of various embodiments described herein, without leaving a detectable amount of residue and/or deposit on the surface of a porous material, doped porous material, or catalyst comprising the porous material or doped porous material. In some instances, the non-metal reductants or mitigation chemicals may include fructose, glucose, dextrose, lactose, levulose, maltose, sucrose, trehalose, other saccharides, monosaccharides, disaccharides, o-glycosyl compounds, cyclic ethers, cyclic alcohols, and other compounds with multiple hydroxyl and ether functionalities around cyclic structures. In some cases, the non-metal reductants or mitigation chemicals may include antioxidants or organic acids such as ascorbic acid, citric acid, phenols, quinones, tocopherol, quercetin, catechins, resveratrol, coumaric acid, and anthocyanins. In cases where the non-metal reductant(s) or mitigation chemical(s) include carbon-containing compound(s), decomposition can result in, for example, formation of char. Even in such cases, the non-metal reductant(s) or mitigation chemical(s) are configured to volatize and/or decompose at or below the drying and/or heat treatment temperature(s), without leaving a detectable amount of carbon or carbon-containing residue and/or carbon or carbon-containing deposit on the surface of the porous material, doped porous material, or catalyst comprising the porous material or doped porous material. In some embodiments, the surface of the porous material, doped porous material, or catalyst comprising the porous material or doped porous material, is substantially free or essentially free of residue (e.g., carbon residue) and/or deposit (e.g., carbon deposit) after the non-metal reductant or mitigation chemical has volatized and/or decomposed at or below the drying and/or heat treatment temperature(s). In some embodiments, the surface of the porous material, doped porous material, or catalyst comprising the porous material or doped porous material, has a trace amount or an undetectable amount of residue and/or deposit after the non-metal reductant or mitigation chemical has volatized and/or decomposed at or below the drying or heat treatment temperature(s).

The non-metal reductant or mitigation chemical may be incorporated into the processing solution at various concentrations, depending on the overall composition of the solution, the concentration of other components, the strength of the acid (or acids) used, or the pH of the solution. In some instances, the mass of the non-metal reductant or mitigation chemical and the mass of the active metal in the processing solution may be approximately equivalent. In some cases, the mass of the mitigation chemical may be significantly less than the mass of the active metal in the solution. In some cases, the mass of the mitigation chemical may be significantly greater than the mass of active metal in the solution.

To prepare a processing solution comprising a non-metal reductant, an effective method to incorporate the non-metal reductant or mitigation chemical may be to dissolve the non-metal reductant or mitigation chemical directly into a metal precursor solution (e.g., ruthenium nitrosyl nitrate solution) that has been prepared to impregnate the porous material with the desired loading of metal. Non-metal reductants such as sucrose and citric acid dissolve easily into these metal precursor solutions to form a processing solution for impregnating a porous material, although other non-metal reductants or mitigation chemicals may require gentle heating of the solution to completely dissolve.

Alternatively, a concentrated solution of a non-metal reductant or mitigation chemical may be prepared. In some cases, the solvent may be the same solvent as in the metal precursor solution. In some instances, a different solvent may be used to act as a co-solvent when the non-metal reductant solution and the precursor solution are mixed. However, the calculations become more complex if incipient wetness impregnation is to be used, as the dilution effect of the reductant solution must be accounted for when adding it to the metal precursor solution. There may be a need to incorporate additional acid to the mixture of solutions that make up a processing solution, to maintain stability of the dissolved metal precursor and/or ensure that the desired precursor species are present. These considerations introduce a higher probability of error into the calculations and generally, this method can be less accurate.

In some instances, a concentration of the non-metal reductant or mitigation chemical in a processing solution may be at least about 1, about 2, about 3, about 4, about 5, about 6, about 7, about 8, about 9, about 10, about 15, or about 20 wt % with respect to the total mass of the solution. In some instances, the concentration of the non-metal reductant or mitigation chemical in a processing solution may be no more than about 5, about 6, about 7, about 8, about 9, about 10, about 15, about 20, or about 25 wt % with respect to the total mass of the solution. In some cases, the concentration of the non-metal reductant or mitigation chemical in a processing solution may range from about 1 to about 25, about 1 to about 20, about 1 to about 15, about 1 to about 10 about 5 to about 20, about 5 to about 15, about 5 to about 10, about 10 to about 20, or about 10 to about 15 wt % with respect to the total mass of the processing solution.

In some embodiments, the concentration of the non-metal reductant or mitigation chemical in a processing solution may be at least about 0.1, about 0.2, about 0.3, about 0.4, about 0.5, about 0.6, about 0.7, about 0.8, about 0.9, or about 1M. In some embodiments, the concentration of the non-metal reductant or mitigation chemical in a processing solution may be no more than about 0.2, about 0.3, about 0.4, about 0.5, about 0.6, about 0.7, about 0.8, about 0.9, or about 1M. In some instances, the concentration of the non-metal reductant or mitigation chemical in a processing solution may range from about 0.1 to about 1, about 0.1 to about 0.6, about 0.1 to about 0.5, about 0.2 to about 1, about 0.2 to about 0.6, about 0.2 to about 0.5, about 0.3 to about 1, about 0.3 to about 0.6, about 0.3 to about 0.5, or about 0.3 to about 0.4M.

In some instances, the mass ratio of the non-metal reductant or mitigation chemical to the active metal in a processing solution may be at least about 10:1, about 15:1, about 20:1, about 25:1, about 50:1, about 100:1, or about 200:1. In some instances, the mass ratio of the non-metal reductant or mitigation chemical to the active metal in a processing solution may be no more than about 10:1, about 15:1, about 20:1, about 25:1, about 50:1, about 100:1, about 200:1, or about 500:1. In some instances, the mass ratio of the non-metal reductant or mitigation chemical to the active metal in a processing solution may range from about 10:1 to about 500:1, about 10:1 to about 200:1, about 10:1 to about 100:1, about 10:1 to about 50:1, about 15:1 to about 100:1, about 15:1 to about 50:1, about 20:1 to about 100:1, about 20:1 to about 50:1, about 25:1 to about 100:1, or about 25:1 to about 50:1.

In some cases, the molar ratio of the non-metal reductant or mitigation chemical to the active metal in a processing solution may be at least about 1:10, about 1:5, about 1:1, about 4:1, about 5:1, about 6:1, about 7:1, about 8:1, about 9:1, about 10:1, about 15:1, about 20:1, about 25:1, about 50:1, or about 75:1. In some cases, the molar ratio of the non-metal reductant or mitigation chemical to the active metal in a processing solution may be no more than about 1:5, about 1:1, about 5:1, about 6:1, about 7:1, about 8:1, about 9:1, about 10:1, about 15:1, about 20:1, about 25:1, about 50:1, about 75:1, or about 100:1. In some cases, the molar ratio of the non-metal reductant or mitigation chemical to the active metal in a processing solution may range from about 1:10 to about 100:1, about 1:10 to about 50:1, about 1:5 to about 100:1, about 1:5 to about 50:1, about 1:1 to about 100:1, about 1:1 to about 50:1, about 4:1 to about 100:1, about 4:1 to about 50:1, about 4:1 to about 10:1, about 5:1 to about 50:1, about 5:1 to about 25:1, or about 5:1 to about 10:1.

In some embodiments, the non-metal reductant or mitigation chemical in a processing solution may be thermally unstable at a temperature within the range used for the drying or heat treatment step. In some embodiments, the non-metal reductant or mitigation chemical in a processing solution may decompose at a temperature within the range used for the drying or heat treatment step. In some embodiments, the non-metal reductant or mitigation chemical in a processing solution may volatize (sublime or evaporate) at a temperature within the range used for the drying or heat treatment step. In some embodiments, the non-metal reductant or mitigation chemical in a processing solution may volatize, and may leave no detectable amount of residue and/or deposit on the surface of the porous material, doped porous material, or a catalyst comprising the porous material or doped porous material, after volatilizing. In some embodiments, the non-metal reductant or mitigation chemical in a processing solution may decompose, and may leave no detectable residue and/or deposit on the surface of the porous material, doped porous material, or a catalyst comprising the porous material or doped porous material, after decomposing. In some embodiments, the non-metal reductant or mitigation chemical in a processing solution may volatize and/or decompose and leave no detectable residue and/or deposit on the surface of the containers or vessels used for the drying or heat treatment step or the containers or vessels used for the scrubber solution.

In some instances, the non-metal reductant or mitigation chemical in a processing solution may volatize and/or decompose at a temperature of at least about 250, about 300, about 350, about 400, about 450, about 500, about 550, about 600, about 650, about 700, about 750, about 800, or about 850° C. In some instances, the non-metal reductant or mitigation chemical in a processing solution may volatize and/or decompose at a temperature of no more than about 300, about 350, about 400, about 450, about 500, about 550, about 600, about 650, about 700, about 750, about 800, about 850, or about 900° C. After volatizing and/or decomposing, the surface of the porous material, doped porous material, or a catalyst comprising the porous material or doped porous material can be substantially free or essentially free of the non-metal reductant or mitigation chemical.

For example, in a first experiment, a porous material was impregnated with ruthenium, using a standard acidic solution of ruthenium nitrosyl nitrate. After drying in a rotovap, the impregnated porous material was subjected to heat treatment (4 hours at 600° C., in a reducing atmosphere of 5 vol % hydrogen in nitrogen). As the ruthenium precursor decomposed, the effluent gases were passed through an aqueous scrubbing solution of sodium carbonate to remove hazardous and corrosive compounds. It was observed that the effluent gases turned the scrubber solution from clear and water white, to black and opaque after a short period of time (less than 1 hour). After the heat treatment step was completed, the scrubbing solution was filtered and a black precipitate was collected. The filtrate was nearly clear or colorless, with a fine suspension of very small, black particles.

In a second experiment, the heat treatment process was repeated with another sample of ruthenium impregnated porous material. However, for this sample, sucrose was combined (to a concentration of 10 wt % with respect to the total mass of the solution) with the acidic ruthenium nitrosyl nitrate solution to prepare the processing solution for impregnation. On completion of the heat treatment process, the scrubber solution remained clear and nearly colorless. The solvent was evaporated from the scrubber solution and a white powder was collected.

Figure 8:
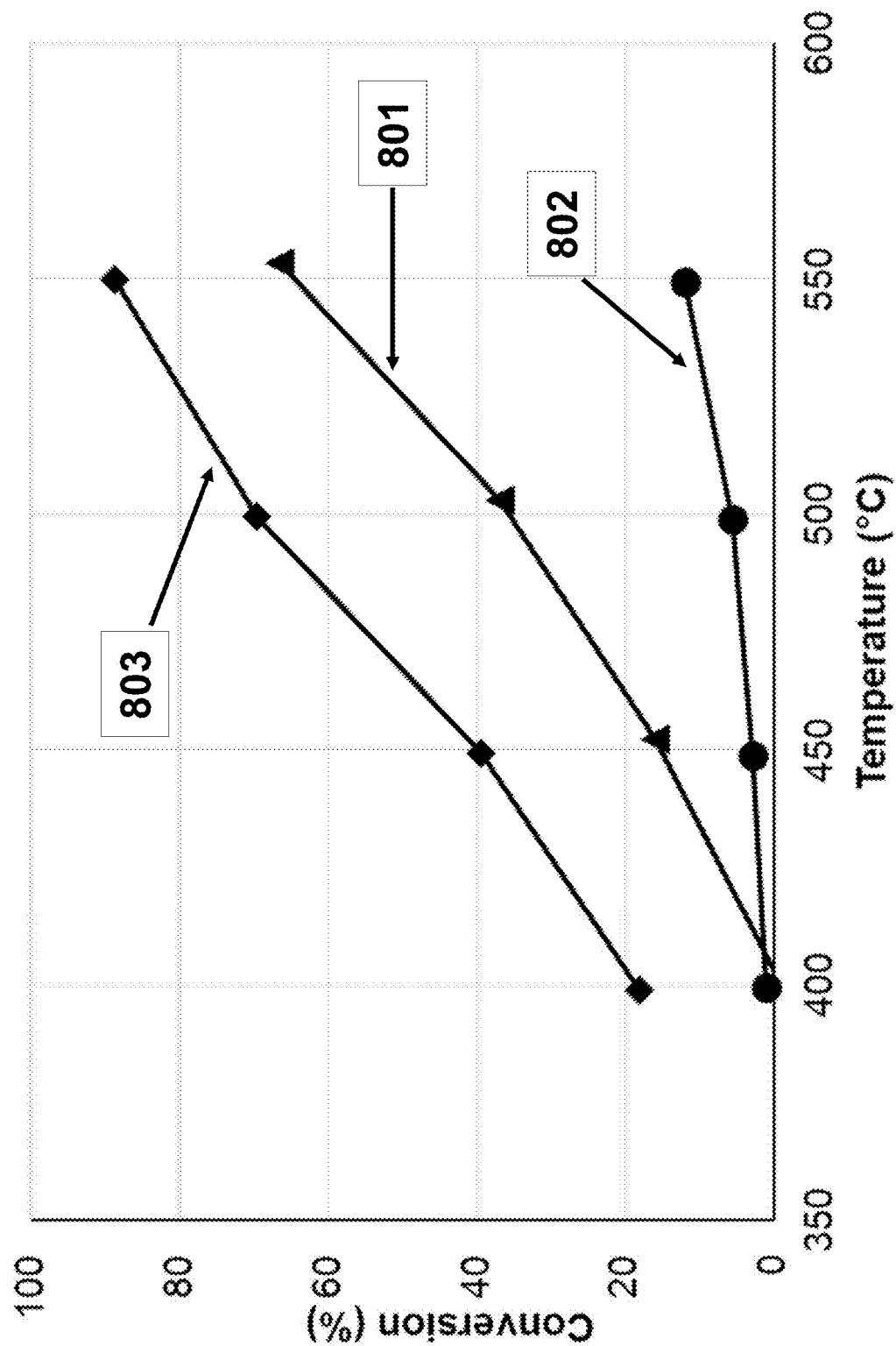
FIG. 8 is a plot illustrating a comparison of ammonia conversion efficiencies for a reference catalyst and different solid materials recovered from the scrubber solution used to treat the gases evolved from the heat treatment step, in accordance with various embodiments of the present disclosure.

The black precipitate and the white powder collected from these solutions were then ground into fine powders and tested to determine if they possessed any catalytic activity. With reference to FIG. 8, the black precipitate from the first experiment exhibited some catalytic activity for ammonia decomposition, as shown by line 801, indicating the presence of ruthenium in the material. Across the range of test temperatures, its ammonia conversion performance profile was similar to the finished catalyst, as shown by line 803, but at approximately 20% lower efficiency. However, the white powder obtained from the clear or colorless solution (the second experiment) exhibited effectively no catalytic activity, as shown by line 802.

Therefore, use of the non-metal reductant or mitigation chemical may eliminate or significantly reduce the loss of expensive active metal to the effluent gases and ensure that the composition of the resulting catalyst aligns with the intended formulation.

In some embodiments, the use of a mitigation chemical or non-metal reductant may result in improved activity for a catalyst comprising the porous material or the doped porous material, in addition to reducing or eliminating the loss of the metal being deposited onto the surface of the porous material. Having established that the incorporation of a non-metal reductant or mitigation chemical (e.g., sucrose or citric acid) in a processing solution may significantly reduce or eliminate the loss of an active metal (e.g., ruthenium) during drying and/or heat treatment, the non-metal reductant's or mitigation chemical's effect on the performance of a finished catalyst was evaluated. For this evaluation, a series of ammonia decomposition catalysts were prepared so that the performance of identical catalyst formulations could be compared, where the main difference in the preparation method was the use of a non-metal reductant or mitigation chemical in the processing solution for making the catalysts.

The porous materials used for this study were alumina beads (approximately 2.0 mm diameter) and a ceria powder. The porous materials were first impregnated with aqueous lanthanum nitrate solution, using the incipient wetness technique to achieve the same loading of lanthanum, before drying and then calcining at 600° C. for 4 hours in air. After cooling, the lanthanated porous materials were impregnated using an aqueous acidic ruthenium nitrosyl nitrate solution, using the incipient wetness impregnation technique to achieve a loading of 2 wt % ruthenium (with respect to the total mass of the porous material and the active metal). The processing solution for some of these catalysts contained sucrose as a non-metal reductant (either about 5 wt % or about 10 wt % sucrose, relative to the total mass of the processing solution). The processing solution for one catalyst contained citric acid instead of sucrose as a non-metal reductant (about 10 wt % citric acid relative to the total mass of the processing solution). The sucrose and the citric acid were added as powders to a ruthenium nitrosyl nitrate solution and stirred, with gentle warming if necessary, until they completely dissolved to form the processing solution that was used to treat the porous material. After drying, the porous materials (now containing ruthenium nitrosyl nitrate) were subjected to heat treatment at 600° C. for 4 hours in a reducing atmosphere containing hydrogen.

The results shown in Table 1 demonstrate that use of these non-metal reductants or mitigation chemicals was not detrimental to the activity and performance of the catalysts for ammonia decomposition. In Table 1, the concentration of the non-metal reductant is expressed as wt % with respect to the total mass of the processing solution.

TABLE 1

Effect of Non-Metal Reductants on Catalyst Performance

| Batch Number | Batch Size | Porous Material | Rare Earth Metal? | Alkali Metal? | Non-Metal Reductant Compound | wt % in Processing Solution | Nominal Reactor Temperature (° C.) 400 | 450 | 500 | 550 |
|---|---|---|---|---|---|---|---|---|---|---|
| | | | | | | | Ammonia Conversion (%) | | | |
| 1 | 2 kg | Alumina Beads | Yes | No | None | — | 21.8 | 45.7 | 78.3 | 97.2 |
| 2 | 2 kg | Alumina Beads | Yes | No | Sucrose | 10 | 43.0 | 82.3 | 98.9 | 99.3 |
| 3 | 2 kg | Alumina Beads | Yes | No | Sucrose | 5 | 36.0 | 75.7 | 98.2 | 99.2 |
| 4 | 5 g | Alumina Beads | Yes | No | None | — | 25.6 | 53.2 | 89.0 | — |
| 5 | 5 g | Alumina Beads | Yes | No | Sucrose | 10 | 31.8 | 62.4 | 91.5 | — |
| 6 | 5 g | Alumina Beads | Yes | No | Citric Acid | 10 | 39.1 | 70.7 | 94.2 | — |
| 7 | 5 g | Alumina Beads | Yes | Yes | None | — | 53.9 | 80.8 | 96.2 | — |
| 8 | 5 g | Alumina Beads | Yes | Yes | Sucrose | 10 | 59.1 | 91.0 | 99.3 | — |
| 9 | 5 g | Ceria Powder | No | No | None | — | 41.7 | 70.8 | 95.7 | — |
| 10 | 5 g | Ceria Powder | No | No | Sucrose | 10 | 45.5 | 84.1 | 99.5 | — |

While the exact mechanism may be unclear, the use of sucrose as the non-metal reductant may significantly reduce the loss of volatile metal oxides during a drying and/or heat treatment step, following deposition of the metal precursors onto the surface of a porous material by impregnating the porous material with the processing solution. Sucrose is a disaccharide consisting of glucose and fructose units bonded by a glycosidic linkage (also known as an acetal oxygen bridge). Therefore, the use of other disaccharides, as well as monosaccharides like glucose and fructose, may have the same effect. Citric acid was observed to be another viable option for the non-metal reductant, so compounds similar in structure to citric acid may result in the same or substantially similar function and result as a monosaccharide or disaccharide used as the non-metal reductant in the processing solution.

It is interesting to note that when sucrose or citric acid were present in the ruthenium nitrosyl nitrate solution, the activity of the resulting catalysts appeared to improve significantly compared to catalysts made without sucrose or citric acid. The improvement in activity may be greater than expected from preventing the loss of a relatively small amount of ruthenium during the final heat treatment step. Therefore, the use of sucrose, citric acid, and similar compounds may result in at least one of the following: (i) reduced sintering of the ruthenium into the surface of the porous material, (ii) more efficient dispersion of ruthenium over the surface, or (iii) the formation of nanoparticles with improved characteristics for the desired catalytic function.

A series of experiments was conducted to investigate the effect of sucrose incorporation in a processing solution on the surface characteristics of impregnated porous materials.

5-gram (5 g) samples of three different lanthanated alumina powders were impregnated with a ruthenium nitrosyl nitrate solution, using incipient wetness impregnation. 5-gram samples of the same alumina powders were impregnated (incipient wetness) with a processing solution that included sucrose at 10 wt % concentration (with respect to the total mass of the processing solution). After drying for 4 hours at 70° C., each of the impregnated alumina powders were maintained at 600° C. for 4 hours in a reducing atmosphere comprising hydrogen ($H_2$) to achieve a loading of 8 wt % ruthenium (with respect to the mass of the porous material and the ruthenium).

Figure 9:
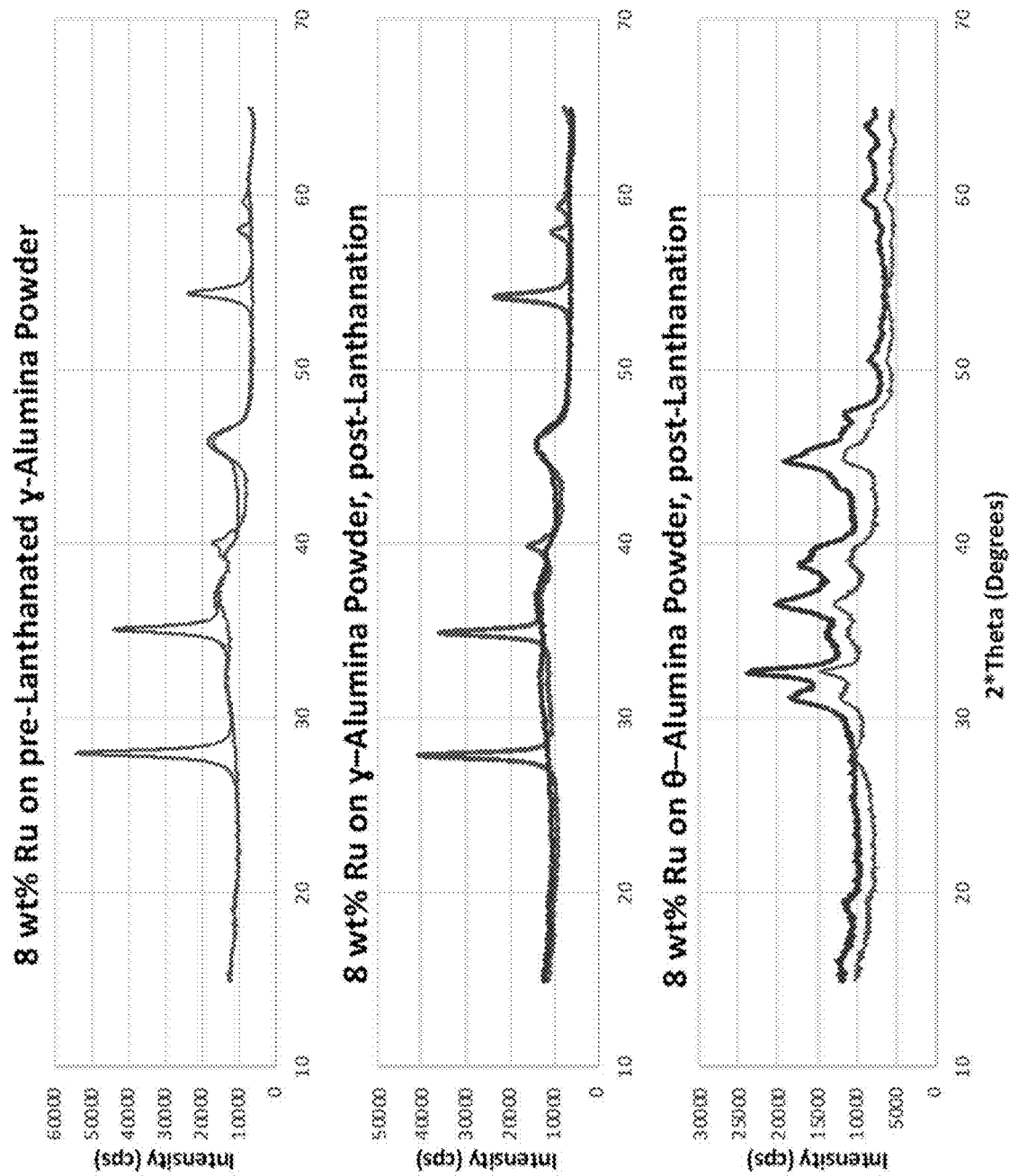
FIG. 9 is a plot illustrating the effect on XRD profiles of various porous lanthanated alumina powders, by incorporating a non-metal reductant in a processing solution, in accordance with various embodiments of the present disclosure.

With respect to FIG. 9, lanthanated alumina powders impregnated with a ruthenium nitrosyl nitrate solution that did not contain sucrose exhibited strong XRD peaks characteristic of ruthenium dioxide ($RuO_2$) crystals and larger ruthenium nanoparticles. These peaks are shown in FIG. 9 for $RuO_2$ (approximately $2\theta=28.2°$, $35.1°$, $40.2°$, $54.5°$, $58.2°$, and $59.4°$) and elemental ruthenium, Ru(0) (approximately $2\theta=38.4°$, $42.5°$, $44.1°$, and $58.5°$). However, when sucrose was included in the ruthenium nitrosyl nitrate solution, the size of these peaks became much smaller or were undetectable.

This effect was also observed with a commercially available lanthanated gamma-alumina powder (containing 3 mol % La with respect to the total number of moles of the alumina and lanthanum), and with a gamma-alumina powder that was impregnated in the laboratory with a lanthanum nitrate solution (to achieve 5 mol % La with respect to the total number of moles of the alumina and lanthanum). For the lanthanated theta-alumina powder (also impregnated in the laboratory to achieve 5 mol % La with respect to the total number of moles of the alumina and lanthanum), the effect was not as pronounced and there were several peaks characteristic of the theta-phase of alumina. However, the diffraction peaks were reduced in size when sucrose was included in the ruthenium nitrosyl nitrate solution. Additionally, no other characteristic peaks were identified that would indicate the presence of carbonaceous deposits, indicating that the sucrose volatilized or decomposed leaving no detectable deposits or residues on the surface of the porous materials.

In another experiment, a 5-gram sample of approximately 2 mm alumina beads was impregnated with a lanthanum nitrate solution to achieve 5 mol % La (with respect to the total number of moles of the alumina and lanthanum), then dried and calcined as described herein. After impregnating the alumina beads with a ruthenium nitrosyl nitrate solution containing 10 wt % sucrose (with respect to the total mass of the solution) and drying (in vacuo, for 4 hours at 70° C.), the impregnated support containing 2 wt % Ru (with respect to the mass of alumina and ruthenium) was subjected to Temperature Programmed Reduction (TPR) analysis including Mass Spectrometry of the evolved gases. The TPR analysis was performed on a 0.5-gram sample of the impregnated alumina beads, using a gas stream of pure hydrogen ($H_2$) and a temperature ramp of 3° C./min from 25° C. to 500° C.

Figure 10:
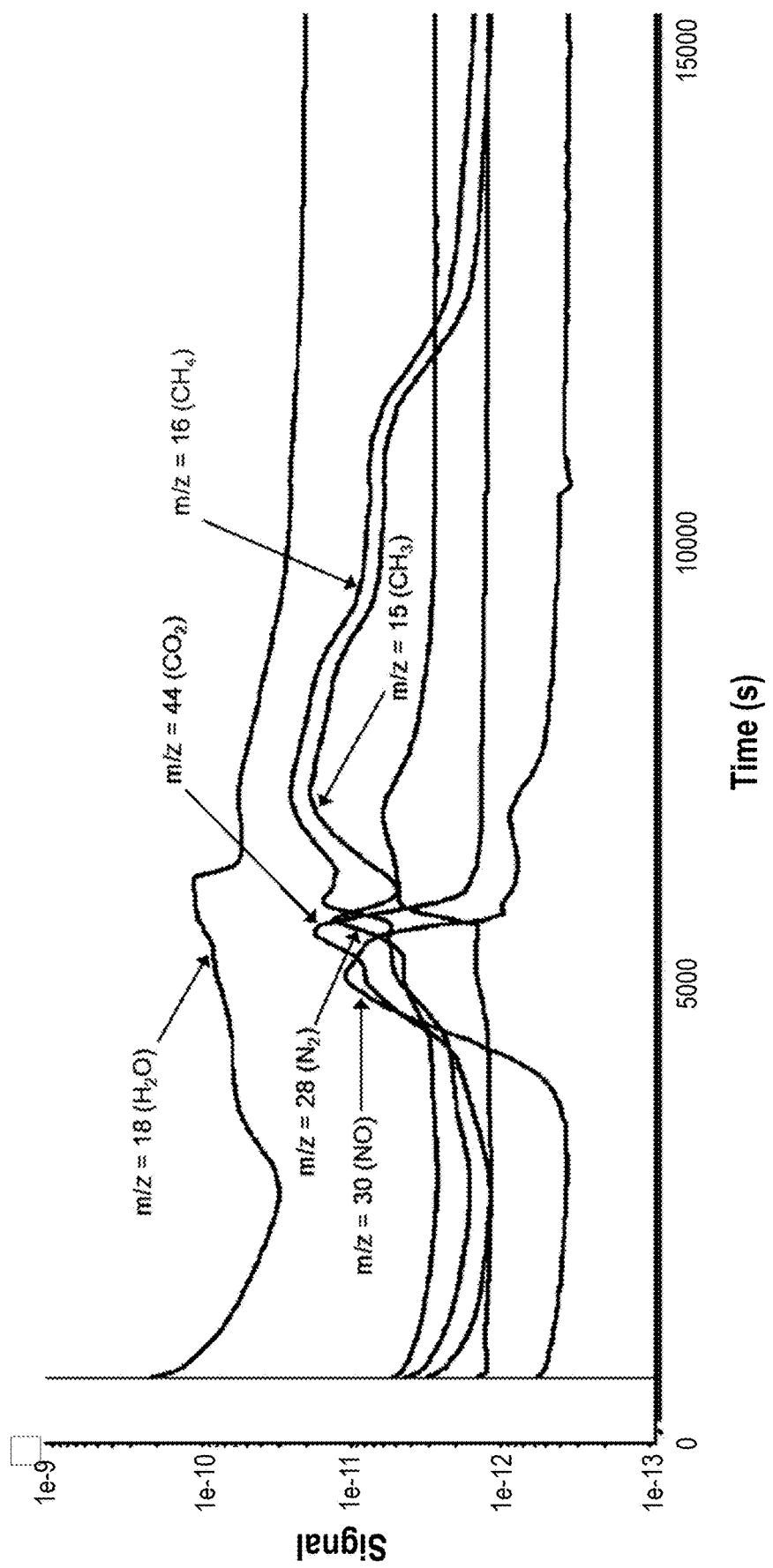
FIG. 10 is a plot illustrating the species detected by Temperature Programmed Reduction of porous lanthanated alumina, impregnated with a processing solution incorporating a non-metal reductant, in accordance with various embodiments of the present disclosure.

With respect to FIG. 10, several low molecular weight (MW) compounds that evolved from the support were detected in the outlet gas stream. Residual water ($H_2O$) was also detected in the evolved gas, as some was adsorbed onto the surface of the support. Nitrogen ($N_2$) and nitrogen monoxide (NO) were also detected, from the decomposition of nitric acid ($HNO_3$) and ruthenium nitrosyl nitrate (Ru($NO$)($NO_3$)$_3$). Carbon dioxide ($CO_2$), methane ($CH_4$) and methyl radicals ($CH_3$) were also detected, from the decomposition of sucrose. As no higher MW carbon-containing species were detected, this indicates that the sucrose decomposed completely into these low MW species.

Another 5 g sample of approximately 2 mm alumina beads was impregnated with lanthanum and ruthenium nitrosyl nitrate, using the same formulation and same process as for the material used to generate the data in FIG. 10. A Temperature Programmed Reduction (TPR) test was conducted on 0.5 g of this sample (as beads), using the same conditions as before. This time, after reaching 500° C., the sample was allowed to cool to 25° C. in the hydrogen stream, before the gas was changed to pure oxygen ($O_2$) for a Temperature Programmed Oxidation (TPO) analysis using the same temperature ramp as for the TPR test. However, for the TPO analysis, when the temperature reached 325° C., the ramp increased to its fastest heating rate until it reached the 500° C. end point.

Figure 11:
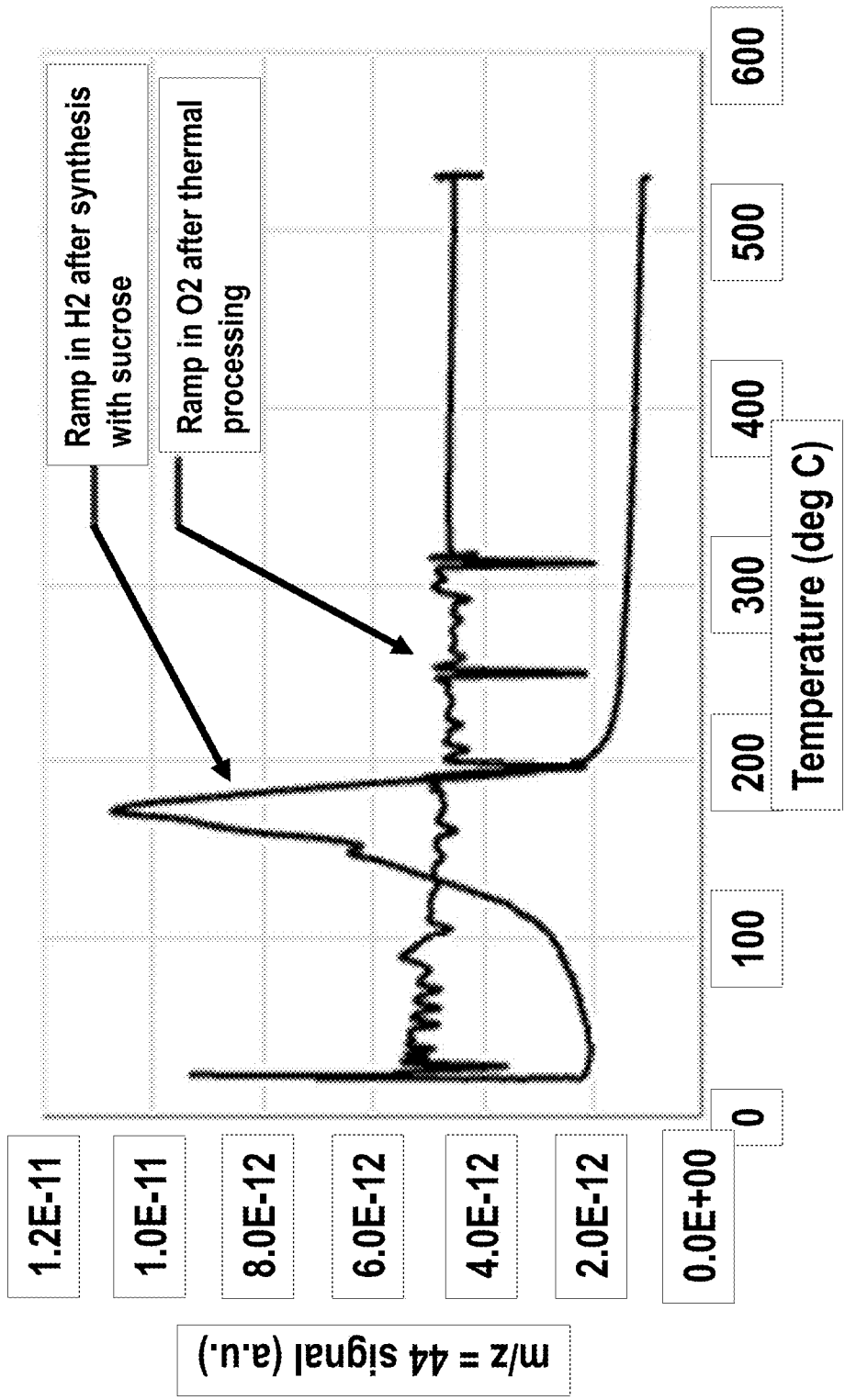
FIG. 11 is a plot illustrating detection of carbon dioxide during Temperature Programmed Reduction of porous lanthanated alumina, impregnated with a processing solution incorporating a non-metal reductant, and the absence of carbon dioxide during subsequent Temperature Programmed Oxidation on the same sample, in accordance with various embodiments of the present disclosure.

With reference to FIG. 11, data is presented only for detection of carbon dioxide ($CO_2$), with m/z=44. Under the reducing conditions of the TPR test, $CO_2$ evolved from the impregnated alumina was detected in the outlet gas stream. When TPO analysis was conducted on the post-TPR sample, no significant traces of $CO_2$ emissions were detected. This confirms that sucrose is decomposed completely during the heat treatment step (using a gas comprising hydrogen), leaving no detrimental or detectable residue or deposit on the surface of the beads.

Quantity of Active Metal Relative to Porous Material or Washcoat Metal

In some embodiments, the porous material may comprise a molar ratio of the base porous material or washcoat metal (e.g., Al, Zr, Si, C) to active metal of about 10:1, about 15:1, about 20:1, about 25:1, about 30:1, about 50:1, about 100:1, about 200:1, or about 500:1. In some embodiments, the porous material may comprise a mass ratio of the base porous material or washcoat metal to active metal of about 10:1, about 15:1, about 20:1, about 25:1, about 30:1, about 50:1, about 100:1, about 200:1, or about 500:1.

Other Embodiments

In one general aspect, the present disclosure provides a processing solution composition comprising: a metal salt; an acid; a solvent; and a non-metal reductant; wherein: a concentration of the metal salt comprises from about 0.01 wt % to about 20 wt % with respect to a total weight of the processing solution, a concentration of the non-metal reductant comprises from about 1 wt % to about 20 wt % with respect to the total weight of the processing solution composition, and a molar ratio of the non-metal reductant and the metal salt comprises from about 1:1 to about 50:1; and wherein the non-metal reductant is capable of volatilizing or decomposing at a temperature that is less than about 900° C.

In some embodiments, the non-metal reductant is capable of leaving no residue or deposit after volatilizing or decomposing at the temperature that is less than about 900° C.

In some embodiments, the metal salt comprises a transition metal.

In some embodiments, the transition metal comprises a platinum group metal.

In some embodiments, the metal salt comprises a chloride, a nitrate, a nitrite, a nitrosyl nitrate, a sulfate, a sulfite, a phosphate, a phosphite, a hydroxide, a carbonyl, a carbonate, a hydrogen carbonate, a bicarbonate, or the salt of an organic acid.

In some embodiments, the metal salt comprises nitrosyl nitrate.

In some embodiments, the acid comprises hydrochloric acid, perchloric acid, nitric acid, sulfuric acid, phosphoric acid, or an organic acid.

In some embodiments, an anion of the metal salt is the anion of the acid.

In some embodiments, the solvent comprises water or an organic solvent.

In some embodiments, the organic solvent comprises an oxygen-containing compound.

In some embodiments, a pH of the processing solution is from about 0 to about 6.

In some embodiments, the non-metal reductant is an organic compound, comprising carbon, hydrogen, and oxygen.

In some embodiments, the non-metal reductant is a saccharide.

In some embodiments, the saccharide is at least one of a monosaccharide and a disaccharide.

In some embodiments, the non-metal reductant is an organic acid.

In some embodiments, the non-metal reductant is at least one of citric acid and ascorbic acid.

In some embodiments, the processing solution further comprises a binder.

In another general aspect, the present disclosure provides a method of impregnating a porous material, the method comprising: forming a doped porous material by covering the porous material with a processing solution that includes a metal salt, an acid, a solvent, and a non-metal reductant, wherein: a concentration of the metal salt comprises from about 0.01 wt % to about 20 wt % with respect to a total weight of the processing solution, a concentration of the non-metal reductant comprises from about 1 wt % to about 20 wt % with respect to the total weight of the processing solution, a molar ratio of the non-metal reductant and the metal salt comprises from about 1:1 to about 50:1, and the non-metal reductant is capable of volatizing or decomposing at a temperature that is less than about 900° C.

In some embodiments, the non-metal reductant is capable of leaving no detectable amount of residue or deposit after volatilizing or decomposing at the temperature that is less than about 900° C.

In some embodiments, the porous material is covered with the processing solution for a period that is greater than about 1 second and less than about 48 hours.

In some embodiments, the method comprises maintaining the doped porous material at a temperature within a range of at least about 300° C. and no more than about 1200° C. in a non-reducing atmosphere.

In some embodiments, the doped porous material can be maintained at the temperature within the range for at least about 30 minutes and no more than about 168 hours.

In some embodiments, the non-reducing atmosphere comprises oxygen ($O_2$).

In some embodiments, the non-reducing atmosphere is free of oxygen ($O_2$).

In some embodiments, the metal salt comprises a transition metal.

In some embodiments, the transition metal comprises a platinum group metal.

In some embodiments, the metal salt comprises a chloride, a nitrate, a nitrite, a nitrosyl nitrate, a sulfate, a sulfite, a perchlorate, a phosphate, a phosphite, a hydroxide, a carbonyl, a carbonate, a hydrogen carbonate, or the salt of an organic acid.

In some embodiments, the acid comprises hydrochloric acid, perchloric acid, nitric acid, sulfuric acid, phosphoric acid, or an organic acid.

In some embodiments, an anion of the metal salt comprises the anion of the acid.

In some embodiments, the solvent comprises water or an organic solvent.

In some embodiments, the organic solvent comprises an oxygen-containing compound.

In some embodiments, a pH of the processing solution is from about 0 to about 6.

In some embodiments, the non-metal reductant is an organic compound comprising carbon, hydrogen, and oxygen.

In some embodiments, the non-metal reductant is a saccharide.

In some embodiments, the saccharide is at least one of a monosaccharide and a disaccharide.

In some embodiments, the non-metal reductant is an organic acid.

In some embodiments, the non-metal reductant is at least one of citric acid and ascorbic acid. In some embodiments, the processing solution further comprises a binder.

In some embodiments, the porous material comprises aluminum, boron, carbon, cerium, chromium, iron, magnesium, nickel, nitrogen, silicon, titanium, zirconium, or a ceramic.

In some embodiments, a form factor of the porous material comprises beads, pellets, tablets, a monolith, or a structured support.

In one general aspect, the present disclosure provides a processing solution that can be used to impregnate a porous material with a desired substance (such as an active catalyst material). The processing solution comprises a metal salt, an acid, a solvent, and a saccharide. The metal salt comprises a ruthenium compound. The solvent comprises at least one of water or an organic alcohol.

In one general aspect, the present disclosure provides a method of fabricating a catalyst for ammonia processing or decomposition, comprising: (a) providing a porous material; (b) thermally, chemically, physically, or electrochemically processing the porous material to alter a pore characteristic of the porous material; (c) depositing a composite support material on the porous material, wherein the composite support material comprises a morphology or a surface chemistry or property; and (d) depositing one or more active metals on at least one of the composite support material and the porous material, wherein the one or more active metals comprise one or more nanoparticles configured to conform to the morphology or the surface chemistry or property of the composite support material or the porous material when subjected to a thermal or chemical treatment, thereby improving one or more active sites on the nanoparticles for ammonia processing or decomposition.

In some cases, the morphology comprises a pore structure, a pore size, a pore shape, a pore volume, a pore density, a pore size distribution, a grain structure, a grain size, a grain shape, a crystal structure, a flake size, or a layered structure. In some instances, the surface chemistry or property comprises an elemental composition, an Arrhenius acidity or basicity, a Lewis acidity or basicity, a surface hydroxyl group density, or a hydrophilicity or hydrophobicity. In some cases, thermally, chemically, physically, or electrochemically processing the porous material comprises subjecting the porous material to one or more thermal, chemical, physical, or electrochemical processes or treatments to improve one or more pores or a surface chemistry or property of the porous material. In some instances, improving the one or more pores comprises (i) modifying a size of the one or more pores, (ii) modifying a pore volume of the porous material, (iii) modifying the pore size distribution or (iv) modifying a pore density of the porous material. In some cases, improving the surface chemistry or property comprises modifying (i) an Arrhenius acidity or basicity, (ii) a Lewis acidity or basicity, (iii) a surface hydroxyl group density, or (iv) a surface hydrophilicity or hydrophobicity.

In some cases, the composite support material is deposited using physical vapor deposition or chemical vapor deposition. In some instances, the morphology or the surface chemistry or property of the composite support material conforms to a morphology or a surface chemistry or property of the porous material. In some cases, the one or more active metals are deposited using physical vapor deposition or chemical vapor deposition. In some instances, the method may further comprise thermally or chemically activating the one or more active metals. In some cases, thermally, physically, chemically, or electrochemically activating the one or more active metals induces a growth of one or more nanoparticles of the active metals. In some instances, the one or more nanoparticles are configured to grow while conforming to the morphology or the surface chemistry or property of the composite support material when thermally, physically, electrochemically, or chemically activated. In some cases, the method may further comprise combining the porous material with one or more promoters to modify or improve a morphology, an active site, an electron density, an Arrhenius acidity or basicity, a Lewis acidity or basicity, or an electron state of the porous material.

In some cases, the one or more promoters comprise sodium (Na), potassium (K), rubidium (Rb), cesium (Cs), magnesium (Mg), calcium (Ca), strontium (Sr), or barium (Ba). In some cases, the one or more active metals comprise ruthenium (Ru), nickel (Ni), rhodium (Rh), iridium (Ir), cobalt (Co), molybdenum (Mo), iron (Fe), platinum (Pt), chromium (Cr), palladium (Pd), or copper (Cu). In some cases, the porous material comprises aluminum oxide ($Al_2O_3$), magnesium oxide (MgO), cerium dioxide ($CeO_2$), silicon dioxide ($SiO_2$), yttrium oxide ($Y_2O_3$), zirconium oxide ($ZrO_2$), one or more natural or synthetic zeolites, titanium dioxide ($TiO_2$), lanthanum oxide ($La_2O_3$), chromium oxide ($Cr_2O_3$), or calcium oxide (CaO). In some cases, the composite support material comprises a carbon-based material, a boron-based material, or a metal oxide. In some instances, the carbon-based material comprises graphite, activated carbon (AC), one or more carbon nanotubes (CNT), one or more carbon nanofibers (CNF), graphene oxide (GO), one or more carbon nanoribbons, or reduced graphene oxide (rGO). In some cases, the boron-based material comprises hexagonal boron nitride (hBN), boron nitride nanotubes (BNNT), or boron nitride nanosheets (BNNS). In some instances, the metal oxide comprises aluminum oxide ($Al_2O_3$), titanium dioxide ($TiO_2$), magnesium oxide (MgO), lanthanum oxide ($La_2O_3$), cerium dioxide ($CeO_2$), yttrium oxide ($Y_2O_3$), one or more $CeO_2$ nanotubes, nanorods or nanocubes, mesoporous silica, zirconium dioxide ($ZrO_2$), chromium oxide ($Cr_2O_3$), or calcium oxide (CaO). In some cases, the composite support material may include yttria-stabilized zirconia (YSZ), hydrotalcite ($Mg_2Al$-LDO), a metal organic framework (MOF) (e.g., MIL-101), a zeolitic imidazolate framework (ZIF), an alkaline amide ($NaNH_2$, $Ca(NH_2)_2$, $Mg(NH_2)_2$), an inorganic electride (e.g., C12A7:e-), Halloysite nanotubes (HNT), $ABO_3$ Perovskite, $AB_2O_4$ Spinel, a mesoporous silicate (e.g., MCM-41), or any combination thereof.

In some instances, the method may further comprise thermally, physically, chemically or electrochemically treating a surface of the porous material to improve a pore structure or a surface chemistry or property of the porous material. In some cases, the one or more ammonia molecules are configured to bind or attach to the one or more active sites on the active metals for decomposition of the one or more ammonia molecules. In some instances, the positions, orientations, and/or density of the one or more active sites are determined based at least in part on the morphology and/or surface chemistry or property. In some cases, the porous material comprises a bead, a pellet, a powder, a thin film, a monolith, a foam, a reformer wall, a heating element, one or more wires, a mesh, engineered or corrugated sheet, or a porous material form factor. In some instances, the pore characteristic comprises a pore structure, a pore size, a pore size distribution, a pore shape, a pore volume, or a pore density. In some cases, the method may comprise altering a pore density of the porous material. In some instances, the method may comprise increasing the pore density of the porous material.

In another embodiment, the present disclosure provides a catalyst for ammonia processing or decomposition, comprising: a porous material comprising one or more modified pore characteristics generated by thermal, physical, chemical, or electrochemical processing of the porous material; a composite support material provided on the porous material, wherein the composite support material comprises a morphology or a surface chemistry or property; and one or more active metals provided on or embedded in at least one of the composite support material and the porous material, wherein the one or more active metals comprise one or more nanoparticles configured to conform to the morphology or the surface chemistry or property of the composite support material or porous material when thermally, physically, chemically or electrochemically activated, thereby improving one or more active sites on the nanoparticles for ammonia processing or decomposition.

In some cases, the composite support material is deposited using physical vapor deposition or chemical vapor deposition. In some instances, the morphology or the surface chemistry or property of the composite support material conforms to a morphology or a surface chemistry or property of the porous material. In some cases, the one or more active metals are deposited using physical vapor deposition or chemical vapor deposition. In some instances, the one or more active metals are configured to conform to the morphology or the surface chemistry or property of the composite support material or porous material when thermally or chemically activated. In some cases, the one or more active metals are configured to grow when thermally, physically, chemically, or electrochemically activated. In some instances, the one or more nanoparticles are configured to grow while conforming to the morphology or the surface chemistry or property of the composite support material or porous material.

In some instances, the morphology or the surface chemistry or property is generated or improved by thermally, physically, chemically, or electrochemically treating a surface of the porous material. In some cases, the one or more active metal nanoparticles comprise one or more active sites to which one or more ammonia molecules are configured to attach or bind for decomposition of the one or more ammonia molecules. In some instances, the positions, orientations, or density of the one or more active sites are determined based at least in part on the morphology or surface chemistry or property. In some instances, the porous material comprises a bead, a pellet, a powder, a thin film, a monolith, a foam, reformer wall, heating element, wires, mesh, engineered or corrugated sheet, or a porous material form factor.

While various embodiments of the methods and compositions have been shown and are described herein, it will be understood by those skilled in the art that such embodiments are provided by way of example only. Numerous variations, changes, and substitutions, including various combinations and sub-combinations, may occur to those skilled in the art without departing from this disclosure. It should be understood that various alternatives to the embodiments of the methods and compositions described herein may be employed. It should be understood that any of the embodiments, configurations and/or components described with respect to a particular figure may be combined with other embodiments, configurations and/or components described with respect to other figures.

The terminology used herein is for the purpose of describing particular embodiments only and is not intended to be limiting of exemplary embodiments.

As used herein, the singular forms "a", "an", and "the" include plural references unless the context clearly indicates or dictates otherwise. For example, "a", "an", and "the" may be construed to mean "one or more."

The terms "substantially free of" and "essentially free of" are used herein interchangeably to mean that the entity being described can have a relatively small amount of the item that it is "essentially free of". This small amount can be present passively or added deliberately. The threshold of what quantity constitutes "essentially free of" depends on the entity being described and can range from an undetectable amount to a trace amount, to less than about 0.01%, to less than about 0.05%, to less than about 0.1%, to less than about 0.5%, to less than about 1%, or to less than about 5%. The threshold quantity can be low enough to not disrupt the essential properties of the entity being described. Similarly, if a method "does not comprise" adding a substance, that is used herein to mean that a substantial amount of the substance is not added, but may be present (e.g., as an impurity), or is not added at a quantity sufficient to disrupt the essential properties of the entity being made.

As used herein, the terms "catalyst" and "catalysts" refer to a material that promotes a chemical reaction (i.e., increases the rate of reaction by decreasing the activation energy of the reaction) without being consumed in the reaction. The term "catalyst" includes a material or materials capable of promoting the following endothermic reaction: $2NH_3 \rightarrow N_2 + 3H_2$.

The various embodiments discussed above are not intended to be exhaustive or to limit the disclosure to the precise forms disclosed. Many modifications and variations are possible in view of the above teachings. The embodiments were chosen and described to explain the principles of the disclosure and its practical applications, to thereby enable others skilled in the art to make and use the disclosure, including the various embodiments with various modifications suited to a particular contemplated use.

What is claimed is:

1. A method of preparing a catalyst, the method comprising:
   (a) forming a doped porous material by impregnating a porous alumina support with a processing solution that includes a ruthenium salt, an acid, a solvent, and a non-metal reductant, wherein:
      the solvent comprises water and/or an organic alcohol,
      the volume of the processing solution is approximately equal to the pore volume of the porous alumina support,
      the acid and the ruthenium salt have a common anion and/or a common ligand,
      a concentration of the ruthenium salt ranges from about 5 wt % to about 10 wt % with respect to a total weight of the processing solution, providing a concentration of ruthenium ranging from about 1.5 wt % to about 8 wt % with respect to a total weight of the catalyst,
      a concentration of the non-metal reductant ranges from about 5 wt % to about 20 wt % with respect to the total weight of the processing solution,
      the non-metal reductant is citric acid or ascorbic acid, and
      a molar ratio of the non-metal reductant to the ruthenium in the processing solution ranges from about 1:10 to about 50:1; and
   (b) a heating the doped porous material to remove the non-metal reductant by at least one of volatilization or decomposition, wherein the surface of the support is substantially free of residue, deposit, or both in response to the at least one of volatilization or decomposition of the non-metal reductant, wherein the doped porous material is heated to a temperature that is less than about 900° C.,
      wherein on contact with a gas comprising ammonia ($NH_3$), the catalyst exhibits a conversion efficiency of ammonia to hydrogen ($H_2$) of at least about 31.8% at a temperature of about 400° C. and a weight hourly space velocity (WHSV) of about 10,000 $mL_{NH3}\ h^{-1}\ g_{cat}^{-1}$.

2. The method of claim 1, wherein heating the doped porous material comprises maintaining the doped porous material at a temperature within a range of from about 300° C. to about 600° C. in a reducing atmosphere comprising about 3-8% hydrogen ($H_2$).

3. The method of claim 1, wherein heating the doped porous material comprises maintaining the doped porous material at a temperature within a range of from about 300° C. to about 600° C. in a non-reducing atmosphere comprising oxygen ($O_2$).

4. The method of claim 1, wherein heating the doped porous material comprises maintaining the doped porous material at a temperature within a range from about 300° C. to about 600° C. in a non-reducing, anoxic atmosphere.

5. The method of claim 1, wherein the ruthenium salt comprises a chloride, a nitrate, a nitrite, a nitrosyl nitrate, a sulfate, a sulfite, a phosphate, a phosphite, a carbonyl, or the salt of an organic acid.

6. The method of claim 1, wherein the ruthenium salt comprises ruthenium nitrosyl nitrate.

7. The method of claim 1, wherein the acid comprises hydrochloric acid, perchloric acid, nitric acid, sulfuric acid, phosphoric acid, acetic acid, or acetoacetic acid.

8. The method of claim 1, wherein the non-metal reductant is citric acid.

9. The method of claim 1, wherein the processing solution comprises a binder.

10. The method of claim 1, wherein the porous alumina support comprises a form factor comprising beads, pellets, tablets, a monolith, or a structured support.

11. The method of claim 1, wherein the porous alumina support comprises at least one of a rare earth metal, an alkali metal, or an alkaline earth metal.

12. The method of claim 11, wherein the porous alumina support comprises a rare earth metal.

13. The method of claim 1, wherein the ruthenium concentration ranges from about 2 wt % to about 5 wt % with respect to the total weight of the catalyst.

14. The method of claim 1, wherein on contact with a gas comprising ammonia ($NH_3$), the catalyst exhibits a conversion efficiency of ammonia to hydrogen ($H_2$) of at least about 62.4% at a temperature of about 450° C. and a weight hourly space velocity (WHSV) of about 10,000 $mL_{NH3}$ $h^{-1}$ $g_{cat}^{-1}$.

15. The method of claim 1, wherein on contact with a gas comprising ammonia ($NH_3$), the catalyst exhibits a conversion efficiency of ammonia to hydrogen ($H_2$) of at least about 94.2% at a temperature of about 500° C. and a weight hourly space velocity (WHSV) of about 10,000 $mL_{NH3}$ $h^{-1}$ $g_{cat}^{-1}$.

16. A method of preparing a catalyst, the method comprising:
(a) forming a doped porous material by impregnating a porous support with a processing solution that includes a ruthenium salt, an acid, a solvent, and a non-metal reductant, wherein:
the solvent comprises water and/or an organic alcohol,
the volume of the processing solution is approximately equal to or greater than the pore volume of the porous support,
the acid and the ruthenium salt have a common anion and/or a common ligand,
a concentration of the ruthenium salt ranges from about 5 wt % to about 10 wt % with respect to a total weight of the processing solution, providing a concentration of ruthenium ranging from about 1.5 wt % to about 8 wt % with respect to a total weight of the catalyst,
a concentration of the non-metal reductant ranges from about 5 wt % to about 20 wt % with respect to the total weight of the processing solution,
the non-metal reductant is citric acid, and
a molar ratio of the non-metal reductant to the ruthenium in the processing solution ranges from about 1:10 to about 50:1; and
(b) heating the doped porous material to remove the non-metal reductant by at least one of volatilization or decomposition, wherein the surface of the support is substantially free of residue, deposit, or both in response to the at least one of volatilization or decomposition of the non-metal reductant, wherein the doped porous material is heated to a temperature that is less than about 900° C.,
wherein on contact with a gas comprising ammonia ($NH_3$), the catalyst exhibits a conversion efficiency of ammonia to hydrogen ($H_2$) of at least about 31.8% at a temperature of about 400° C. and a weight hourly space velocity (WHSV) of about 10,000 $mL_{NH3}$ $h^{-1}$ $g_{cat}^{-1}$.

17. The method of claim 16, wherein heating the doped porous material comprises maintaining the doped porous material at a temperature within a range of from about 300° C. to about 600° C. in a reducing atmosphere comprising about 3-8% hydrogen ($H_2$).

18. The method of claim 16, wherein heating the doped porous material comprises maintaining the doped porous material at a temperature within a range of from about 300° C. to about 600° C. in a non-reducing atmosphere comprising oxygen ($O_2$).

19. The method of claim 16, wherein heating the doped porous material comprises maintaining the doped porous material at a temperature within a range from about 300° C. to about 600° C. in a non-reducing, anoxic atmosphere.

20. The method of claim 16, wherein the ruthenium salt comprises a chloride, a nitrate, a nitrite, a nitrosyl nitrate, a sulfate, a sulfite, a phosphate, a phosphite, a carbonyl, or the salt of an organic acid.

21. The method of claim 16, wherein the acid comprises hydrochloric acid, perchloric acid, nitric acid, sulfuric acid, phosphoric acid, acetic acid, or acetoacetic acid.

22. The method of claim 16, wherein the processing solution comprises a binder.

23. The method of claim 16, wherein the porous support comprises aluminum, boron, carbon, or silicon.

24. The method of claim 16, wherein the porous support comprises a form factor comprising beads, pellets, tablets, a monolith, or a structured support.

25. The method of claim 16, wherein the porous support comprises alumina.

26. The method of claim 16, wherein the porous support comprises at least one of a rare earth metal, an alkali metal, or an alkaline earth metal.

27. The method of claim 16, wherein the ruthenium concentration ranges from about 2 wt % to about 5 wt % with respect to the total weight of the catalyst.

28. A method of preparing a catalyst, the method comprising:
(a) forming a doped porous material by impregnating a porous support with a processing solution that includes a ruthenium salt, an acid, a solvent, and a non-metal reductant, wherein:
the solvent comprises water and an oxygenated hydrocarbon,
the volume of the processing solution is approximately equal to or greater than the pore volume of the porous support,
the acid and the ruthenium salt have a common anion and/or a common ligand,
a concentration of the ruthenium salt ranges from about 5 wt % to about 10 wt % with respect to a total weight of the processing solution, providing a concentration of ruthenium ranging from about 1.5 wt % to about 8 wt % with respect to a total weight of the catalyst,
a concentration of the non-metal reductant ranges from about 5 wt % to about 20 wt % with respect to the total weight of the processing solution,
the non-metal reductant is citric acid or ascorbic acid, and
a molar ratio of the non-metal reductant to the ruthenium in the processing solution ranges from about 1:10 to about 50:1; and
(b) heating the doped porous material to remove the non-metal reductant by at least one of volatilization or decomposition, wherein the surface of the support is substantially free of residue, deposit, or both in response to the at least one of volatilization or decomposition of the non-metal reductant, wherein the doped porous material is heated to a temperature that is less than about 900° C., wherein on contact with a gas comprising ammonia ($NH_3$), the catalyst exhibits a conversion efficiency of ammonia to hydrogen ($H_2$) of at least about 31.8% at a temperature of about 400° C. and a weight hourly space velocity (WHSV) of about 10,000 $mL_{NH3}$ $h^{-1}$ $g_{cat}^{-1}$.

29. The method of claim 28, wherein the porous support comprises alumina.

30. The method of claim 28, wherein the non-metal reductant is citric acid.

\* \* \* \* \*